United States Patent [19]

Sato et al.

[11] Patent Number: 5,756,956
[45] Date of Patent: May 26, 1998

[54] WIRE-CUT ELECTRIC DISCHARGE MACHINING APPARATUS AND CONTROL METHOD THEREFOR

[75] Inventors: Seiji Sato; Hisashi Yamada; Takuji Magara, all of Aichi; Yoshihito Imai; Tatsushi Sato, both of Hyogo, all of Japan

[73] Assignee: Mitsubishi Denki Kabushiki Kaisha, Tokyo, Japan

[21] Appl. No.: 531,076

[22] Filed: Sep. 20, 1995

[30] Foreign Application Priority Data

Sep. 20, 1994 [JP] Japan .................. 6-224793

[51] Int. Cl.⁶ .................. B23H 1/02; B23H 7/04
[52] U.S. Cl. .................. 219/69.18; 219/69.12
[58] Field of Search .................. 219/69.12, 69.13, 219/69.18, 69.19

[56] References Cited

U.S. PATENT DOCUMENTS

| | | | |
|---|---|---|---|
| 3,705,286 | 12/1972 | Kondo | 219/69.13 |
| 3,816,692 | 6/1974 | Ratmansky | 219/69.13 |
| 4,081,652 | 3/1978 | Jänicke et al. | 219/69.12 |
| 4,329,558 | 5/1982 | Martin | 219/69.12 |
| 4,581,513 | 4/1986 | Obara et al. | 219/69.12 |
| 4,673,789 | 6/1987 | Ozaki et al. | 219/69.12 |
| 4,703,144 | 10/1987 | Goto et al. | 219/69.18 |
| 4,798,929 | 1/1989 | Itoh | 219/69.12 |
| 4,970,363 | 11/1990 | Obara et al. | 219/69.12 |
| 5,171,957 | 12/1992 | Rabian | 219/69.13 |
| 5,276,301 | 1/1994 | Kohsaka et al. | 219/69.12 |
| 5,453,593 | 9/1995 | Seok-Yong et al. | 219/69.18 |
| 5,496,984 | 3/1996 | Goto et al. | 219/69.18 |

FOREIGN PATENT DOCUMENTS

| | | |
|---|---|---|
| 62-19322 | 1/1987 | Japan . |
| 62-292317 | 12/1987 | Japan . |
| 63-74520 | 4/1988 | Japan . |
| 2212023 | 8/1990 | Japan . |
| 33722 | 1/1991 | Japan . |

OTHER PUBLICATIONS

Milberg, J.: "Messwerterfassung an Drahtfunkenerosionsanlagen;" In: Industrie–Anzeiger 16/1987, pp. 40–41.

Spur, G.; "Schönbeck, J.: Leistungspotentiale beim Drahterodieren". In: VDI–Z 134 (1992), No. 5—May, pp. 87–93.

Primary Examiner—Geoffrey S. Evans
Attorney, Agent, or Firm—Sughrue, Mion, Zinn, Macpeak & Seas, PLLC

[57] ABSTRACT

A wire-cut electric discharge machining apparatus and a control method for the wire-cut EDM apparatus. The amount of current pulses supplied to a machining gap can be measured precisely without a detection delay to thereby detect the occurrence of faulty machining such as wire electrode breakage and centralized arcs.

18 Claims, 22 Drawing Sheets

WIRE-CUT ELECTRIC DISCHARGE MACHINING APPARATUS AND CONTROL METHOD THEREFOR

BACKGROUND OF THE INVENTION

1. Field of the Invention

The present invention relates to an electrical discharge machining apparatus and its control method, and particularly to an electrical discharge machining apparatus and a control method thereof, which is capable of preventing an occurrence of the breakage of a wire electrode during machining, improving machining efficiency, and avoiding abnormal machining operation under abnormal condition such as occurrence of arc discharge.

2. Background of the Art

FIG. 22 shows a conventional wire electrical discharge machining apparatus. In this drawing, 1 indicates a wire electrode, 2 represents a workpiece, 3 denotes a machining gap formed by the wire electrode 1 and the workpiece 2, 4 designates a table which secures the workpiece 2, 5a indicates an X-axis drive motor which drives the table 4 in an X-axis direction, 5b designates a Y-axis drive motor which drives the table 4 in a Y-axis direction, 6 denotes an axis drive control device which controls the X- and Y-axis drive motors 5a, 5b, 7 represents a machining power supply which supplies the machining gap 3 with discharge current pulses, 8 indicates a machining power supply control circuit which controls the switching operation of the machining power supply 7, 9 denotes a voltage detection circuit which detects a machining voltage at the machining gap, 10 designates an NC control apparatus into which NC programs are entered and from which an axis drive command and machining condition parameter information are output, 11 represents an average voltage detection circuit which detects an average voltage at the machining gap, and 12 indicates an NC program.

FIG. 23 shows discharge waveforms at the machining gap in the conventional example, wherein 30a and 30b designate discharge voltage waveforms and 31a and 32b represent discharge current waveforms.

Operation will now be described. In accordance with machining electrical condition parameters preset in the NC program 12 or the NC control apparatus 10, the control apparatus 10 outputs this parameter information to the machining power supply control circuit 8. On the basis of said parameters, the machining power supply control circuit 8 outputs to the machining power supply 7 a drive signal which has a predetermined current peak, pulse width and off time. The machining power supply 7 is driven under the control of this drive signal and a predetermined current pulse is supplied to the machining gap 3 to perform machining. The voltage detection circuit 9 detects the generation of a discharge according to the voltage waveform at the machining gap 3, measures a delay time between the application of the voltage to the machining gap 3 and the generation of a discharge (hereinafter referred to as the "no-load time"), and outputs the result of this measurement to the machining power supply control circuit 8.

If the no-load time from the application of the voltage to the machining gap 3 up to the generation of a discharge is short as indicated by 30a in FIG. 23 (immediate discharge), the machining power supply control circuit 8 judges that the machining gap is nearly in a faulty state, such as a short circuit or an arc, and supplies a current waveform of small pulse width and low peak as indicated by 31a (hereinafter referred to as the "small pulse"). Conversely, if the no-load time is relatively long as indicated by 30b, the machining power supply control circuit 8 judges it as a normal discharge and supplies a current waveform of large pulse width and high peak as indicated by 31b (hereinafter referred to as the "large pulse").

The triangular waveforms different in peak are often employed especially in wire-cut electrical discharge machining. By controlling the current waveform (such as the peak value) according to the discharge state, the breakage of the wire electrode and the like can be prevented, improving machining speed sharply. In accordance with the average voltage during machining detected by the average voltage detection circuit 11, the NC control apparatus 10 outputs the drive command to the axis drive control apparatus 6, which then drives the X-axis motor 5a and the Y-axis motor 5b to exercise electrode feed control (axis drive control). Namely, the NC control apparatus 10 and the axis drive control apparatus 6 exercise control to increase the electrode feedrate (axis travel speed) if the average voltage detected is higher than a predetermined value, and to decrease the electrode feedrate (axis travel speed) if the average voltage detected is lower than the predetermined value.

Since the conventional electrical discharge machining apparatus arranged as described above could not detect the amount of energy output during machining, it had no effective means for reliably preventing faulty machining such as wire electrode breakage and centralized arcs. Although the discharge energy during machining can be found by detecting the average voltage, the conventional average current detection circuit, which used smoothed signals for the voltage and current waveforms of the machining gap, could not carry out precise control due to a detection delay.

In view of the above, a method for preventing a wire electrode from being broken was proposed in Published Unexamined Japanese Patent Application No. 62-19322. A discharge energy is obtained by the product of discharge voltage and discharge current, and the discharge energy is proportional to an area of current waveform due to the fact that the discharge voltage is maintained unchanged. Therefore, To solve the problems in case of carrying out wire-cut electric discharge machining by way of supplying a current having a triangular waveform, according to the conventional method as disclosed in the publication, a signal proportional to the pulse width of a pulse signal from a pulse control circuit which controls the on-off of switching devices is squared to instantaneously obtain the average machining current. When the average machining current of one discharge pulse exceeds a limit current value at which the wire electrode breaks, the pulse control circuit is controlled to reduce the average machining current flowing in the machining gap, thereby preventing the wire from breaking.

Further, in the case where the wire-cut electric discharge machining at a high speed in which a wire-shaped electrode is likely to being broken frequently, discharge frequency is very high frequency such as several hundreds kHz, and therefore it is disadvantageous in that an arithmetic operation device capable of carrying out high speed operation within a period of discharge pulse signal is required.

SUMMARY OF THE INVENTION

It is accordingly an object of the present invention to overcome said problems of the conventional electrical discharge machining apparatus by way of providing an electrical discharge machining apparatus and its control method which can detect discharge energy (or an amount equivalent to the discharge energy) during machining accurately without a detection delay.

It is another object of the present invention to provide an electrical discharge machining apparatus and its control method which can prevent the breakage of a wire electrode and the generation of concentrated arcs reliably.

DESCRIPTION OF THE PREFERRED EMBODIMENTS

A first embodiment of the invention will be described with reference to FIGS. 1 to 5.

Figure 1:
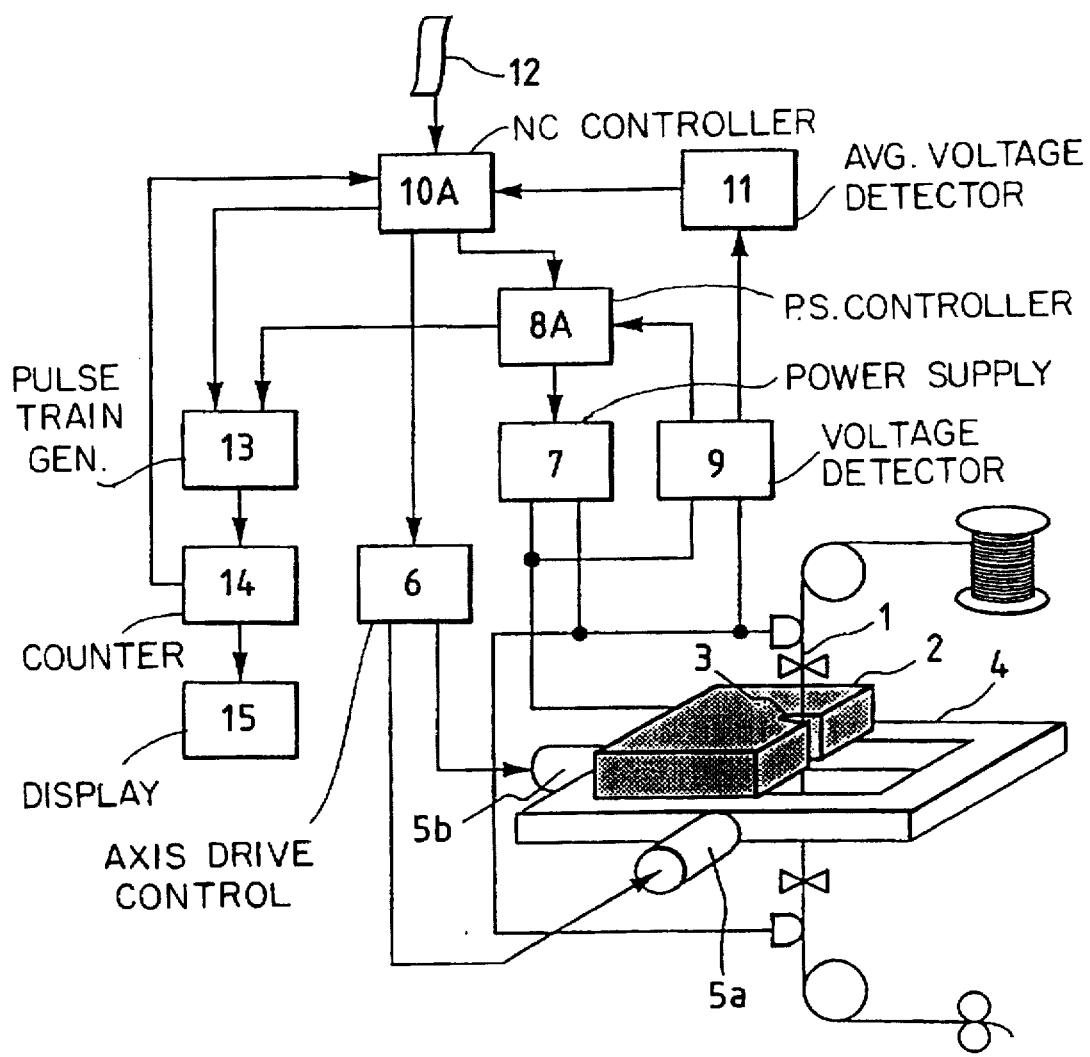
FIG. 1 is a diagram illustrating the arrangement of a wire-cut electric discharge machining apparatus which is a first embodiment of the present invention.

FIG. 1 shows a wire-cut electric discharge machining apparatus according to a first embodiment. In this drawing, 1 indicates a wire electrode, 2 represents a workpiece, 3 denotes a machining gap formed by the wire electrode 1 and the workpiece 2, 4 designates a table which secures the workpiece 2, 5a indicates an X-axis drive motor which drives the table 4 in an X-axis direction, 5b designates a Y-axis drive motor which drives the table 4 in a Y-axis direction, 6 denotes an axis drive control device which controls the X- and Y-axis drive motors 5a, 5b, 7 represents a machining power supply which supplies the machining gap 3 with discharge current pulses, 8A indicates a machining power supply control circuit which controls the switching operation of the machining power supply 7, 9 denotes a voltage detection circuit which detects a machining voltage at the machining gap, 10A designates an NC control apparatus into which NC programs are entered and from which axis drive command, electrical machining condition parameter information, electrode feedrate, etc. are output. Further, the NC control apparatus 11 also receives an output of a counter circuit 14 which will be described later, so as to control the machining power supply control circuit 8A. 11 represents an average voltage detection circuit which detects an average voltage at the machining gap, 12 indicates an NC program, 13 designates a pulse train generation circuit which outputs a pulse train corresponding to the current pulse width of a current pulse waveform applied to the machining gap, 14 represents a counter circuit which integrates the number of said pulse trains generated within a predetermined period of time, and 15 denotes a display device which shows the measurement result of the counter circuit 14.

Figure 2:
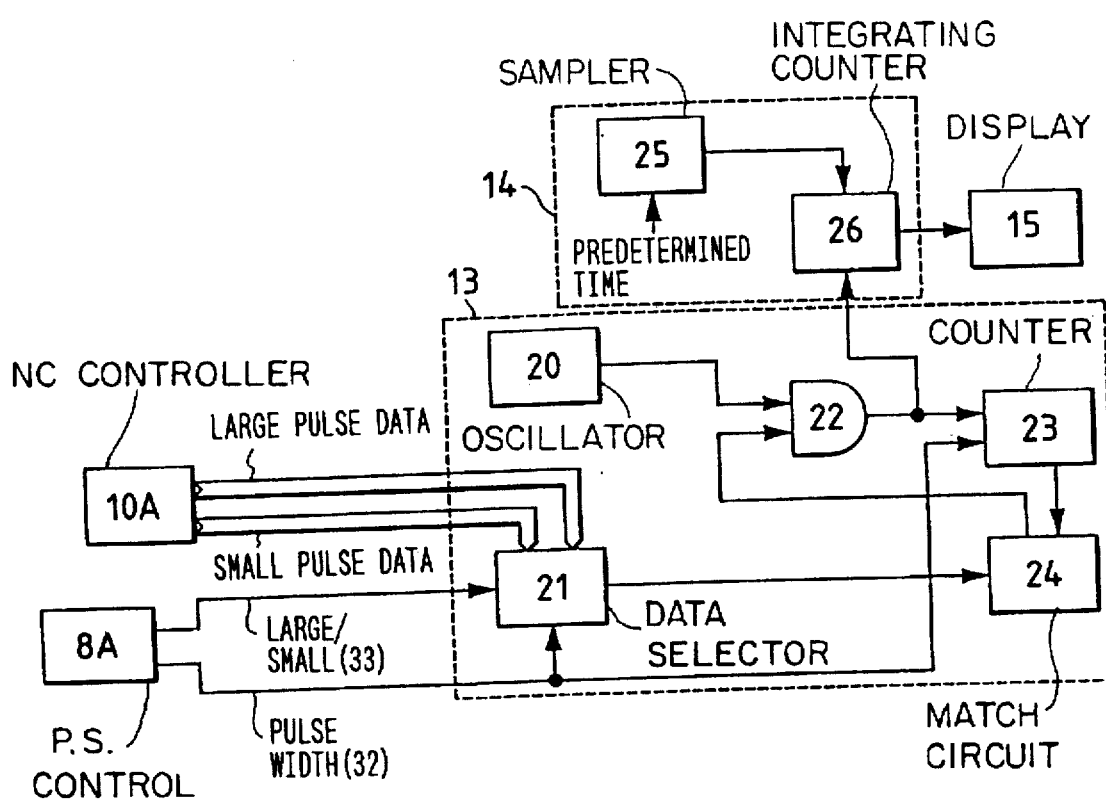
FIG. 2 is a diagram illustrating the details of a pulse train generation circuit and a counter circuit according to the first embodiment.

FIG. 2 shows an embodiment of said pulse train generation circuit 13 and counter circuit 14, wherein 20 indicates an oscillator which outputs a clock signal serving as the reference clock of the pulse train, 21 represents a large-small pulse data selection circuit which receives the pulse width data of large and small pulses from the NC control device 10A, and which also receives a large-small pulse select signal and a pulse width signal from the machining power supply control circuit 8A and selectively outputs the pulse width data of the large and small pulses selected by the machining power supply control circuit 8A. 22 denotes an AND circuit which ANDs the outputs of the oscillator 20 and a match circuit 24. 23 designates a counter which counts the pulse trains output by the AND circuit 22. 24 indicates a match circuit which judges whether the measurement value of the counter 23 and the pulse width data of the large/small pulse match or not. 25 denotes a sampling circuit which sets a predetermined time Tp when the pulse trains output by the pulse train generation circuit 13 are measured, and 26 designates an integrating counter which counts the pulse trains output by the AND circuit 22.

Figure 3:
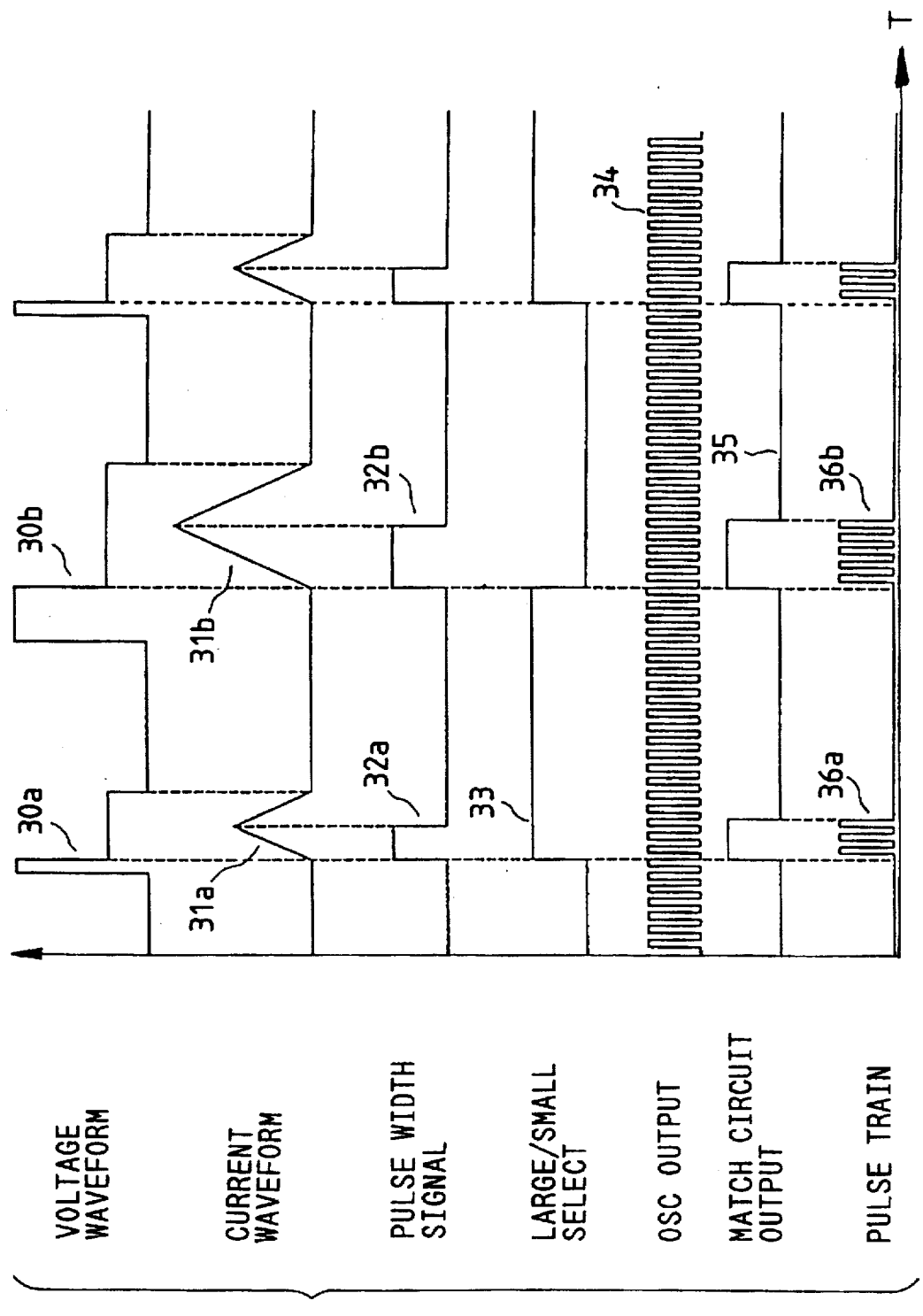
FIG. 3 is a diagram illustrating the operation of the first embodiment.

FIG. 3 shows the discharge waveforms at the machining gap 3, the pulse width signals output by the machining power supply control circuit 8A, the large-small pulse select signal, the clock signal output by the oscillator 20, the match circuit output signal output by the match circuit 24, and the pulse trains output by the pulse train generation circuit 13, wherein 30a and 30b indicate the discharge voltage waveforms, 31a and 31b designate the discharge current waveforms, 32a and 32b denote the pulse width signals which represent the pulse widths of the current pulses supplied to the machining gap 3, 33 indicates the large-small pulse select signal, 34 denotes the clock signal, 35 designates the match circuit output signal, and 36a and 36b indicate the pulse trains.

Figure 4:
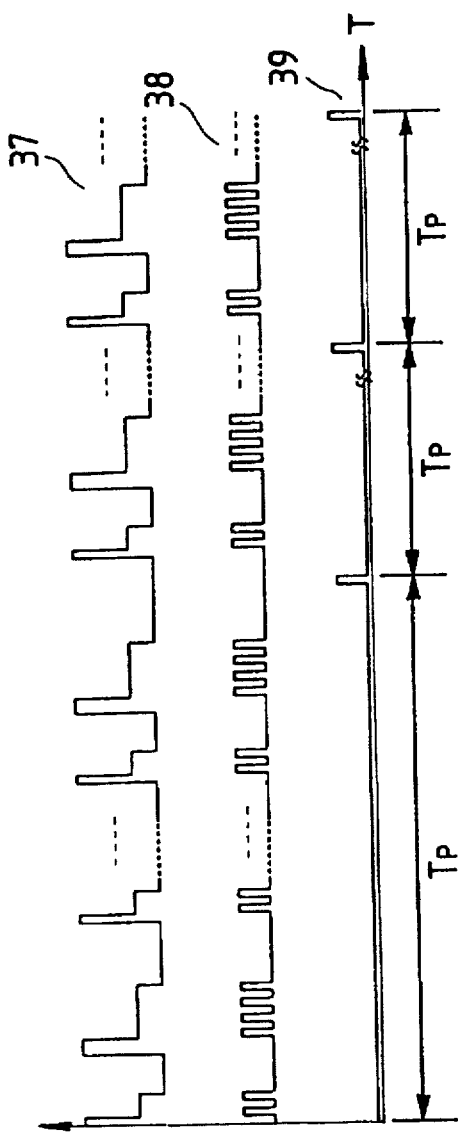
FIG. 4 is a diagram illustrating the operation of the first embodiment.

FIG. 4 shows a discharge waveform at the machining gap 3, the pulse trains output by the pulse train generation circuit 13, and a counter reset signal output by the sampling circuit 25, wherein 37 indicates the discharge voltage waveform, 38 represents the pulse trains, and 39 designates the counter reset signal.

First, the operations of the pulse train generation circuit 13 and the counter circuit 14 will be described with reference to FIGS. 2 to 4.

Namely, when two different current waveforms, a large pulse with a high peak and a small pulse with a low peak, are supplied to the machining gap 3 to machine the workpiece as in the conventional example, the pulse train generation circuit 13 outputs in the following procedure a pulse train corresponding to the current pulse width output to the machining power supply 7 by the machining power supply control circuit 8A. First, the large-small pulse data selection circuit 21 receives from the NC control circuit 10A the pulse width data of the large and small pulses (for example, in case of the large pulse being 5, the small is 3). In addition, the circuit 21 also receives the large-small pulse select signal 33 (when the control circuit 8A selects the large pulse, the signal becomes "L", and when it selects the small pulse, the signal becomes "H".) and the pulse width signal 32a and 32b from the machining power supply control circuit 8A, so that the machining power supply control circuit 8A selects the pulse width data corresponding to the large/small pulse at the timing of an occurrence of the leading edge of the pulse width signal 32a and 32b to be applied to the match circuit 24.

For instance, when "5" has been set as the pulse width data of the large pulse and "3" as the pulse width data of the small pulse in electrical machining conditions and the machining power supply control circuit 8A has selected the current pulse of low peak and small pulse as indicated by 32a in FIG. 3, the large-small pulse data selection circuit 21 selects "3" as the pulse width data and outputs the pulse width data "3" to the match circuit 24. On the other hand, in the case where the circuit 8A has selected the current pulse of high peak and large pulse as indicated by 32b in FIG. 3, the large-small pulse data selection circuit 21 selects "5" as the pulse width data and output the pulse width data "5" to the match circuit 24. In this case, the pulse width data is latched in the circuit 24 until either the following pulse width signal 32a or 32b is applied thereto.

The coincidence circuit 24 compares the output of the counter 23 (count-up value) and the output of the large/small pulse data selection circuit 21 (pulse width data). Upon coincidence thereof, the circuit 24 produces an output of "L" to an AND circuit 22 whereas it produces an output of "H" thereto as a coincidence circuit output 35 at the time other than the coincidence. When the output of the circuit 24 is of "H", the counter 23 is reset on the leading edge of the pulse width signal 32a and starts counting up the output of the oscillator 20. When the value of the counter 23 coincides with the pulse width data in the circuit 24, the output of the circuit 24 is switched to "L". Hence, the output of the AND circuit 23 is terminated after outputting a pulse train representing the pulse width data.

For example, in the case where "3" has been set as pulse width data in the coincidence circuit 24, when the count-up value of the counter circuit 23 becomes "3", the output of the coincidence circuit 24 becomes "L". As a result, the output of the AND circuit 22 outputs the pulse train of three pulses as indicated by 36a. On the other hand, in the case where "5" has been set as pulse width data in the coincidence circuit 24, when the count-up value of the counter circuit 23 reaches "5", the output of the coincidence circuit 24 becomes "L". As a result, the output of the AND circuit 22 outputs the pulse train of five pulses as indicated by 36b. Accordingly, the pulse train generation circuit 13 outputs the pulse train 36a or 36b according to the pulse width of the large/small pulse selected by the machining power supply control circuit 8A.

Subsequently, the counter circuit 14 enters the pulse train output by the pulse train generation circuit 13 into the integrating counter 26 in the counter circuit 14 and measures the number of pulses contained in the pulse trains at intervals of predetermined time. This predetermined time, Tp, is set by the sampling circuit 25. The sampling circuit 25 outputs the reset signal 39, which resets the integrating counter 26, to the integrating counter 26 at intervals of predetermined time Tp. The integrating counter 26, which resets the measured value of the pulse trains by means of the reset signal 39, measures the number of pulses contained in the trains generated within the predetermined time Tp. For example, when discharges having the voltage waveforms as indicated by 37 are generated at the machining gap 3, the pulse train generation circuit 13 outputs the corresponding pulse trains in response to individual discharges, e.g. the pulse trains as indicated by 38. At this time, the integrating counter 26 receives the pulse train 38 and the reset signal 39 output by the sampling circuit 25 and measures the number of pulses contained in the pulse trains generated within the predetermined time Tp.

As described above, since the measurement result of the counter circuit 14 is the sum total of the pulses contained in the pulse trains generated within the predetermined time Tp and the pulse train corresponds to the current pulse width, the amount of current pulses supplied to the machining gap 3 at intervals of predetermined time can be measured precisely without a detection delay. Accordingly, the amount of output energy supplied during machining can be detected, providing effective means for reliably preventing faulty machining such as the wire electrode breakage and centralized arcs.

While the application of the current pulses having two different peaks to the machining gap 3 were described in the present embodiment, the application of current pulses having a single peak or a plurality of peaks to the machining gap 3 also allows the amount of current pulses supplied to the machining gap 3 to be measured precisely without a detection delay. Especially when current pulses having a single peak are applied in the present embodiment, detection can be made with higher accuracy.

The operation of the NC control apparatus 10A will now be described. This NC control apparatus 10A changes the electrical machining condition parameters according to the measurement result of the counter circuit 14 and outputs the new parameters to the machining power supply control circuit 8A to set the electrical machining electrical conditions.

Specifically, the NC control apparatus 10A operates as described below. Namely, as described above, the counter circuit 14 measures at intervals of predetermined time Tp the total number of pulses contained in the pulse trains corresponding to the pulse width of the current pulses supplied to the machining gap 3 and outputs the result of measurement (total number of pulses contained in the pulse trains generated within the predetermined time) to the NC control apparatus 10A. The NC control apparatus 10A changes and controls the machining condition parameters to be output to the machining power supply control circuit 8A according to the measurement result of the counter circuit 14.

For instance, when the total number of pulses contained in the pulse trains generated within the predetermined time is large, the NC control apparatus 10A judges that the energy output to the wire electrode is high, and changes the set values of the electrical machining condition parameters, such as a current pulse off duration, to reduce the total number of pulses contained in the pulse trains generated within the predetermined time Tp. Reversely, when the total number of pulses contained in the pulse trains generated within the predetermined time is small, the NC control apparatus 10A changes the set values of the electrical machining condition parameters to increase the total number of pulses contained in the pulse trains generated within the predetermined time. This allows the output amount of the current pulses (or current pulse energy) during machining to be detected and the current pulses (or current pulse energy) output to be controlled according to the electrical machining conditions, whereby faulty machining such as the wire electrode breakage and centralized arcs can be prevented reliably.

The operation of the display device 15 will now be described.

As described above, the counter circuit 14 measures at intervals of predetermined time the total number of pulses contained in the pulse trains corresponding to the pulse width of the current pulses supplied to the machining gap 3 and outputs the measurement result (total number of pulses contained in the pulse trains generated within the predetermined time) to the display device 15. The display device 15 shows the measurement result of the counter circuit 14 as the energy output during machining.

Figure 5:
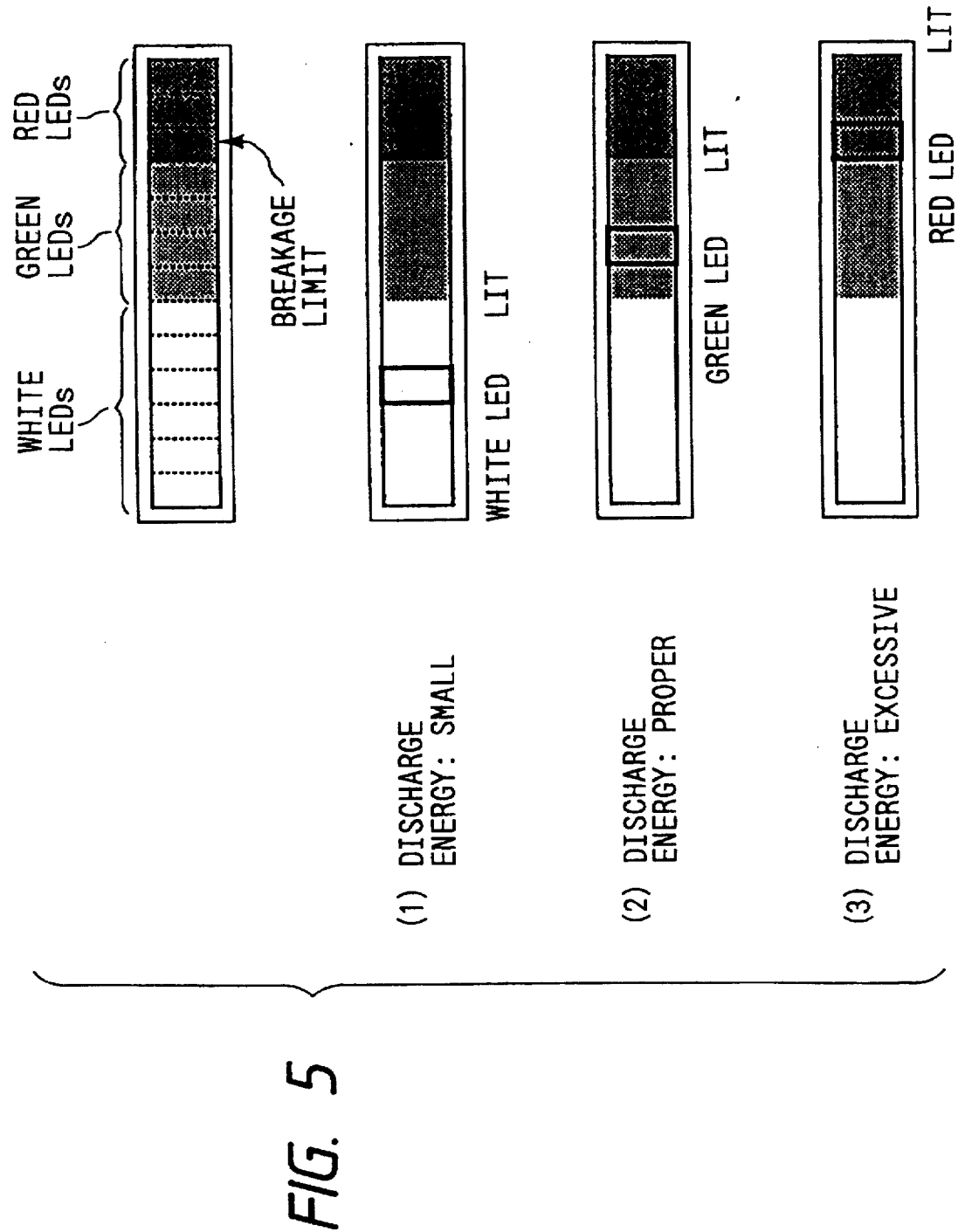
FIG. 5 is a diagram illustrating the operation of a display device in the first embodiment.

For example, as shown in FIG. 5, three-color (white, green, red) LEDs are used to constitute an output energy level meter, and (1) the white LED is lit to indicate low output energy; (2) the green LED is lit to indicate proper output energy; and (3) the red LED is lit to indicate that the output energy is excessive (exceeds the breakage limit of the wire electrode) to allow the operator to easily judge whether or not the set values of the electrical machining condition parameters, such as the peak value, pulse width, off time, etc. of the current pulses, are appropriate, whereby it is possible to prevent the wire breakage from occurring. In addition, the electrical machining conditions can be selected easily to reduce the operator burden.

Since the operation of the other circuit components in the first embodiment is substantially same as that of the conventional ones, detailed explanation therefor is omitted.

The second embodiment of the invention will be described with reference to FIGS. 6 and 7.

Figure 6:
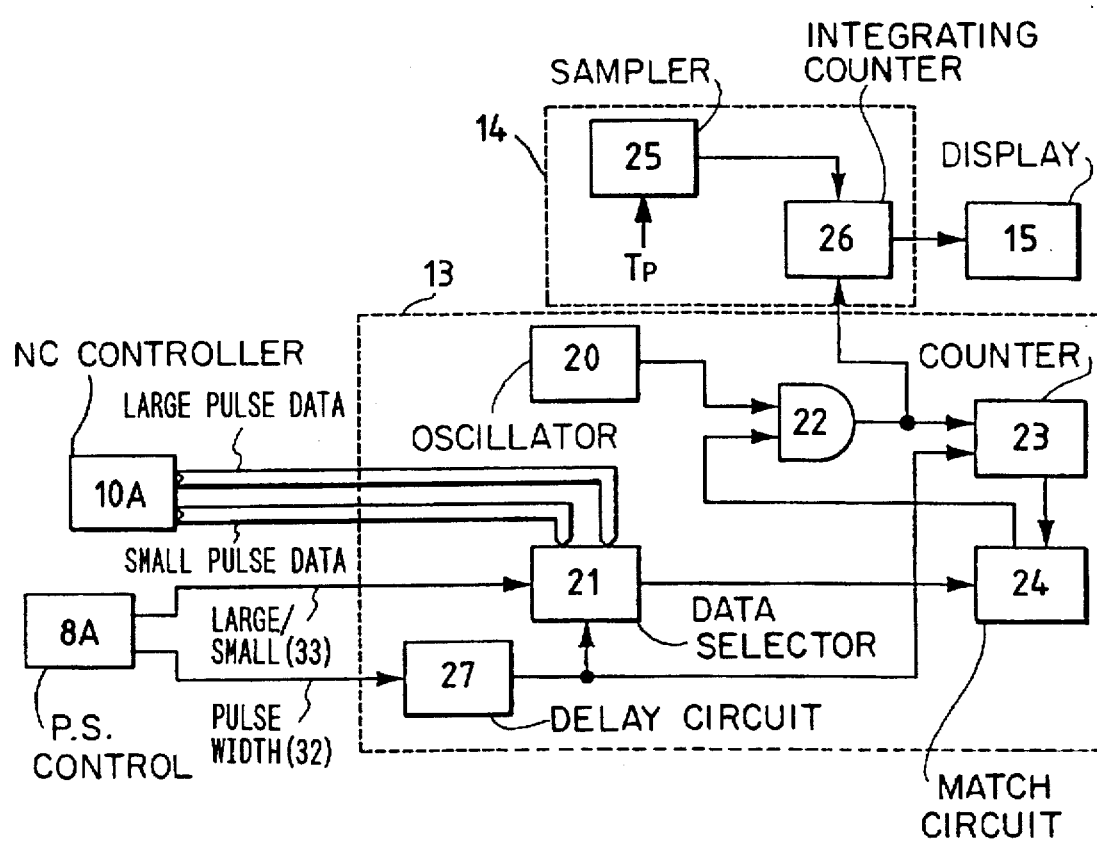
FIG. 6 is a diagram illustrating the details of an embodiment of a pulse train generation circuit and a counter circuit according to a second embodiment.

FIG. 6 shows modifications to the pulse train generation circuit 13 and the counter circuit 14 in the first embodiment, wherein 20 to 26 designate identical or corresponding parts to those in the first embodiment. 27 indicates a delay circuit which delays the pulse width signal so that the pulse train generation circuit 13 outputs the pulse trains after the supply of the machining current has stopped.

Figure 7:
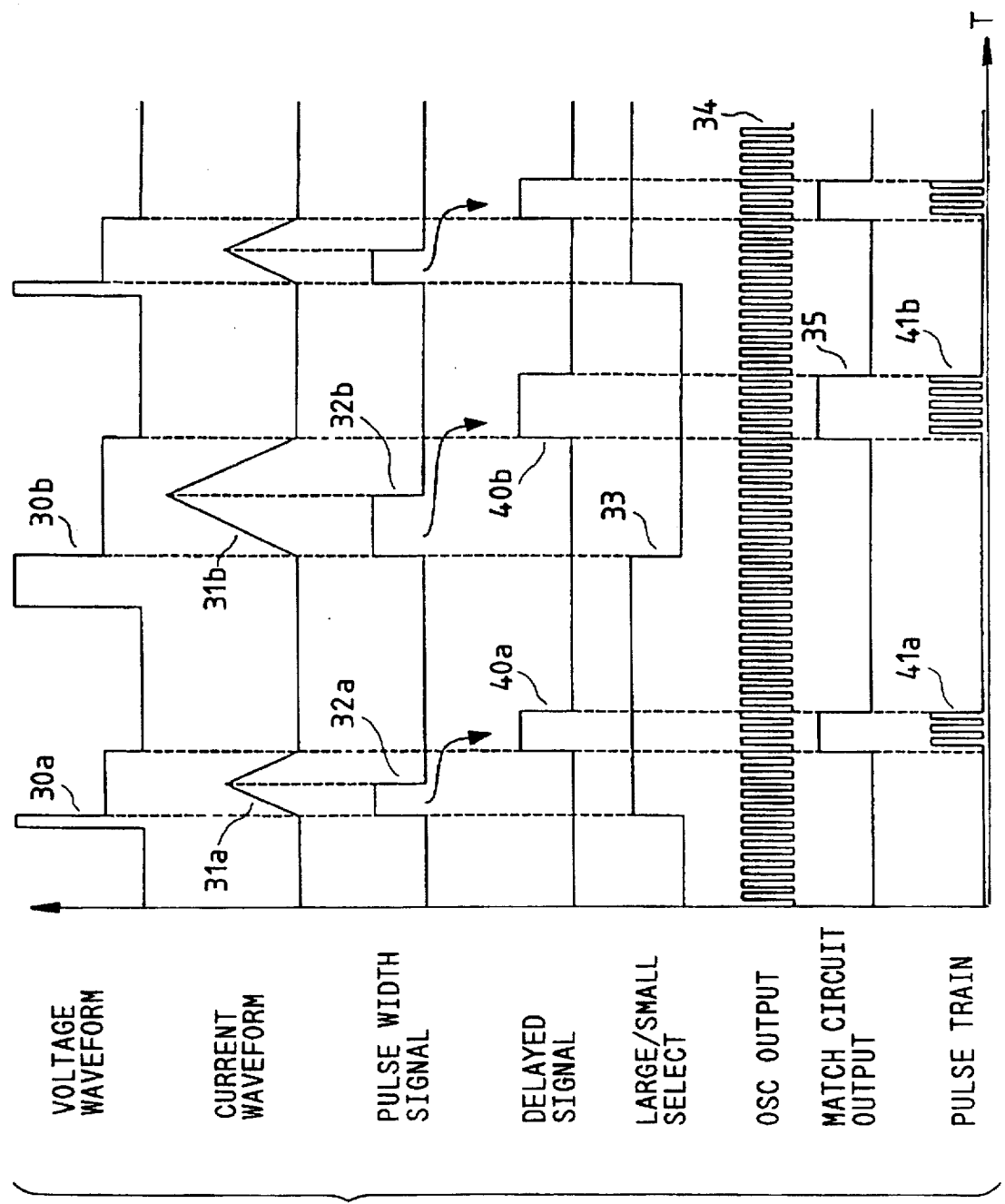
FIG. 7 is a diagram illustrating the operation of the second embodiment.

FIG. 7 shows the discharge waveforms at the machining gap 3 in a second embodiment, the pulse width signals output by the machining power supply control circuit 8A, the large-small pulse select signal, delayed signals output by the delay circuit 27, the clock signal output by the oscillator 20, the match circuit output signal output by the match circuit 24, and the pulse trains output by the pulse train generation circuit 13, wherein 30a and 30b indicate the discharge voltage waveforms, 31a and 31b designate the discharge current waveforms, 32a and 32b denote the pulse width signals representing the pulse widths of the current pulses supplied to the machining gap 3, 40a and 40b indicate the pulse width signals delayed, 33 represents the large-small pulse select signal, 34 denotes the clock signal, 35 designates the match circuit output signal, and 41a and 41b indicate the pulse trains.

Operation will now be described. When, as in the first embodiment, two different current waveforms of large pulses with a high peak and small pulses with a low peak are supplied to the machining gap 3 to machine the workpiece, the delay circuit 27 receives the pulse width signal and delays the pulse width signal as indicated by 40a or 40b to avoid the influence of noise generated while the current pulse is supplied and to output the pulse train after the supply of the machining current has stopped. Using the pulse width signal delayed, the pulse train generation circuit 13 operates as in the first embodiment to output the pulse train corresponding to the current pulse width during the off duration. For instance, as shown in FIG. 7, the pulse train generation circuit 13 outputs the pulse train of three pulses 41a in response to the small pulse of low peak indicated by 32a or the pulse train of five pulses 41b in response to the large pulse of high peak indicated by 32b. Then, the counter circuit 14 also operates as in the first embodiment to measure at intervals of the predetermined time Tp the total number of pulses contained in the pulse trains output by the pulse train generation circuit 13.

As described above, because the measurement result of the counter circuit 14 is the sum total of the pulses contained in the pulse trains generated within the predetermined time Tp and the pulse train corresponds to the current pulse width, the amount of current pulses supplied to the machining gap 3 at intervals of predetermined time Tp can be measured precisely without a detection delay, and further, misoperation due to the influence of noise generated during the supply of the current pulse can be prevented to enable measurement with high accuracy. Accordingly, the amount of output energy supplied during machining can be detected.

providing effective means for reliably preventing faulty machining such as the wire electrode breakage and centralized arcs.

The third embodiment of the invention will be described with reference to FIGS. 8 to 10.

Figure 8:
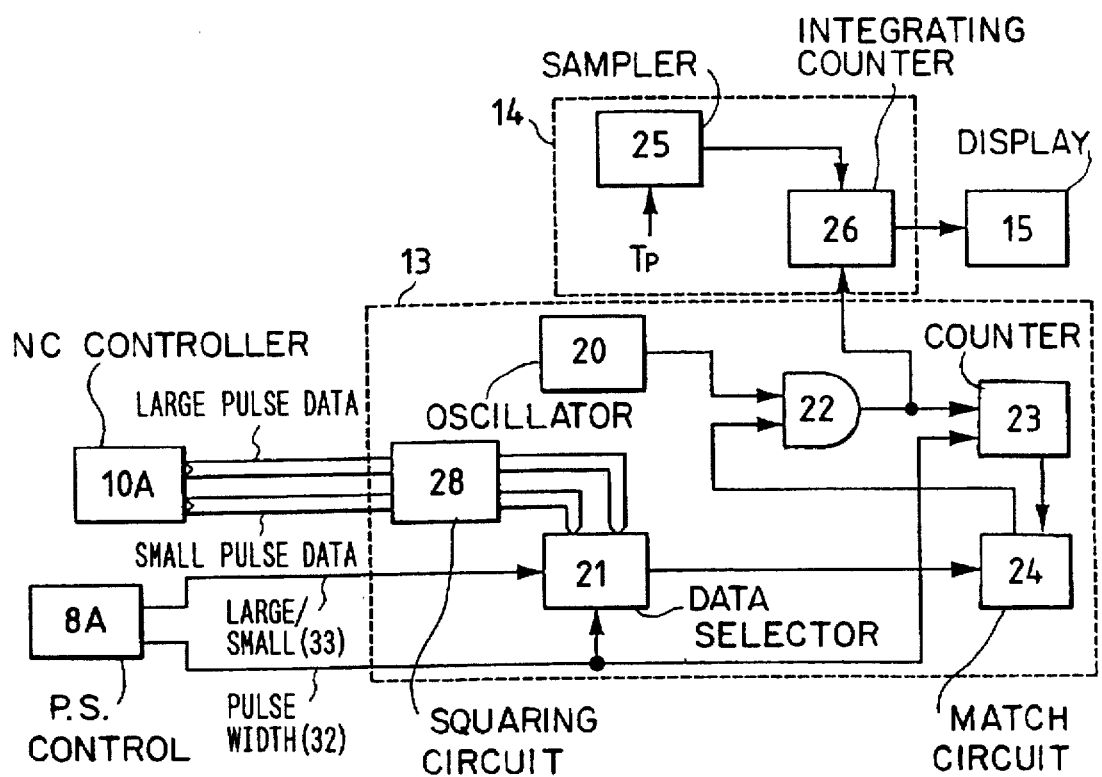
FIG. 8 is a diagram illustrating the details of an embodiment of a pulse train generation circuit and a counter circuit according to a third embodiment.

FIG. 8 shows modifications to the pulse train generation circuit 13 and the counter circuit 14 in the first embodiment, wherein 20 to 26 designate identical or corresponding parts to those in the first embodiment. 28 indicates a pulse width data squaring circuit which squares the large and small pulse width data entered from the NC control device 10A into the large-small pulse data selection circuit 21 so that the pulse train generation circuit 13 outputs a pulse train equivalent to machining energy.

Figure 9:
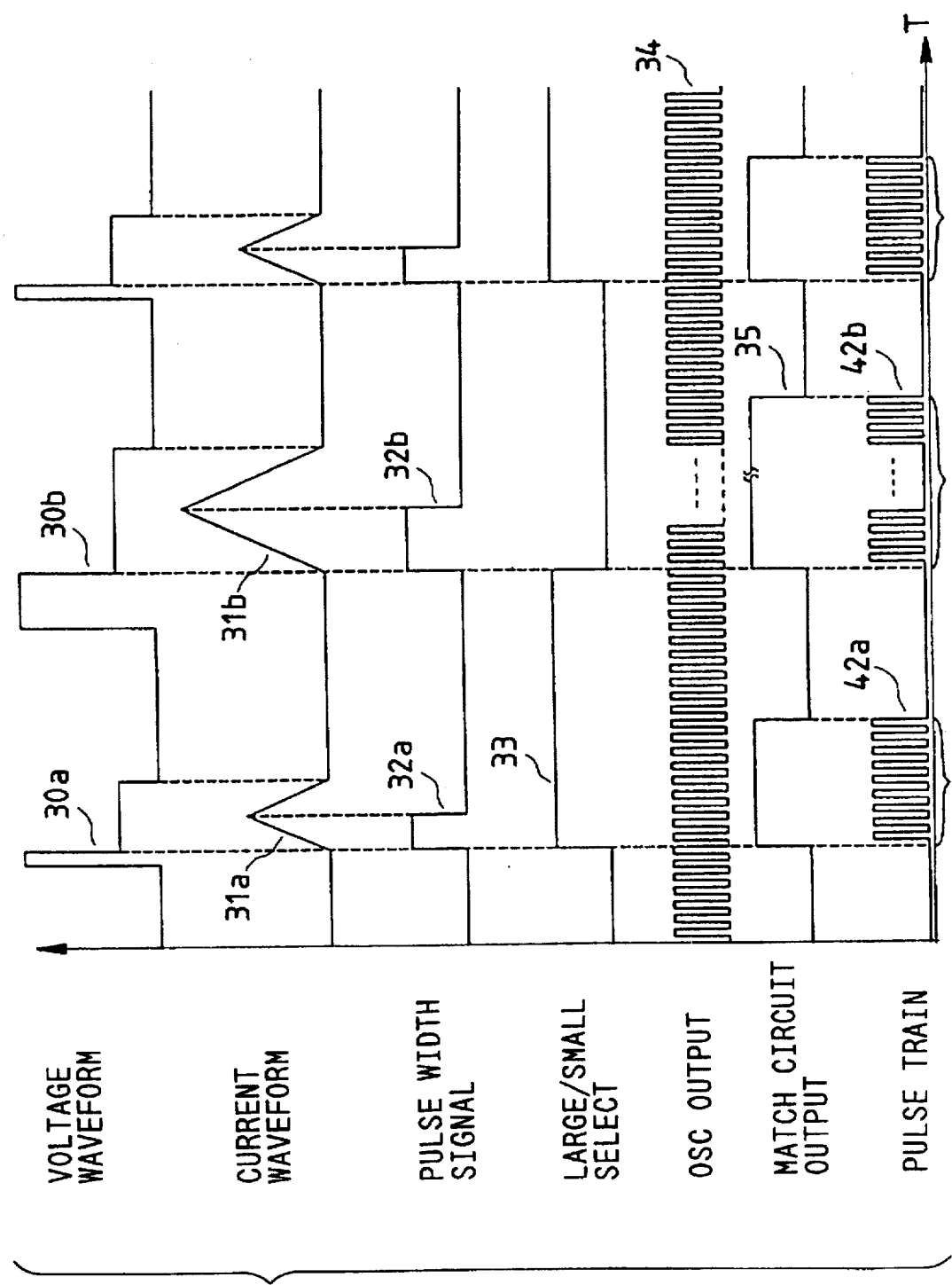
FIG. 9 is a diagram illustrating the operation of the third embodiment.

FIG. 9 shows discharge waveforms at the machining gap 3 in a third embodiment, the pulse width signals output by the machining power supply control circuit 8, the large-small pulse select signal, the clock signal output by the oscillator 20, the match circuit output signal output by the match circuit 24, and the pulse trains output by the pulse train generation circuit 13, wherein 30a and 30b indicate the discharge voltage waveforms, 31a and 31b designate the discharge current waveforms, 32a and 32b denote the pulse width signals representing the pulse widths of the current pulses supplied to the machining gap 3, 33 represents the large-small pulse select signal, 34 denotes the clock signal, 35 designates the match circuit output signal, and 42a and 42b indicate the pulse trains equivalent to machining energies.

Figure 10:
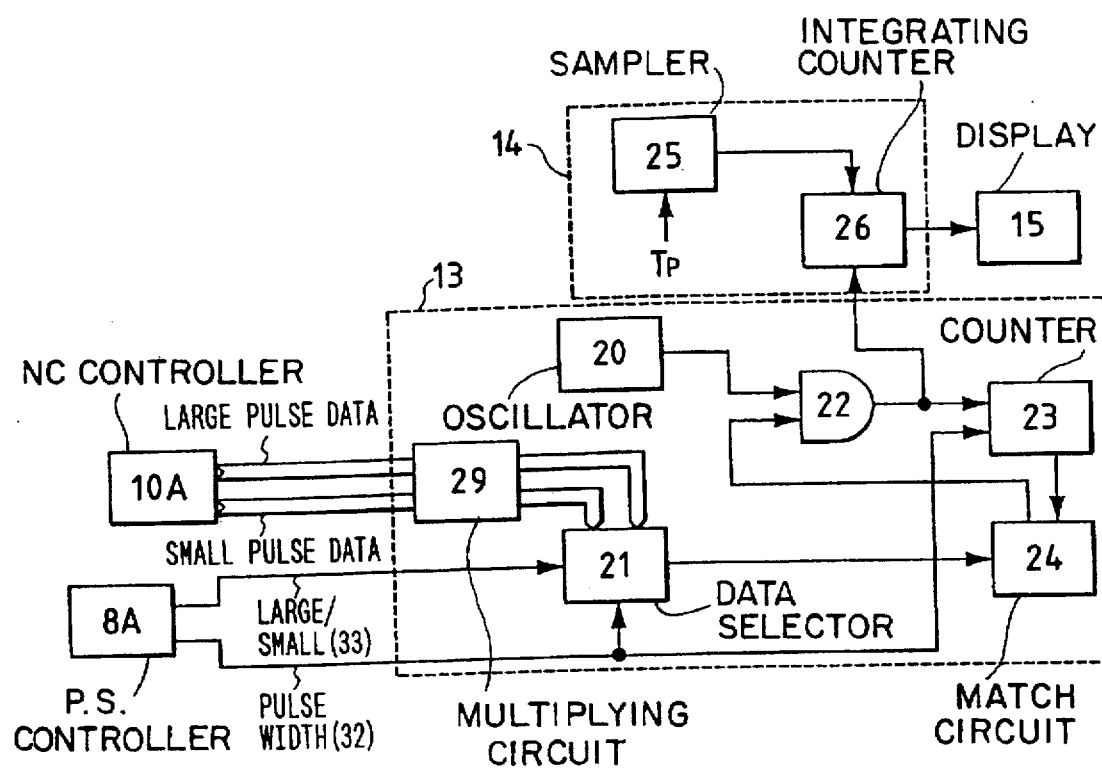
FIG. 10 is a diagram illustrating the details of an alternative embodiment of a pulse train generation circuit and a counter circuit according to the third embodiment.

FIG. 10 shows an alternative embodiment of the pulse train generation circuit 13 and the counter circuit 14 in the third embodiment, wherein 20 to 26 designate identical or corresponding parts to those in the first embodiment. 29 indicates a pulse width data multiplying circuit which multiplies the large and small pulse width data entered from the NC control device 10A into the large-small pulse data selection circuit 21 by values corresponding to the peak values of the current pulses so that the pulse train generation circuit 13 outputs a pulse train equivalent to the machining energy.

Operation will now be described. When, as in the first embodiment, two different current waveforms of large pulses with a high peak and small pulses with a low peak are supplied to the machining gap 3 to machine the workpiece in the embodiment shown in FIG. 8, the pulse train generation circuit 13 first outputs in the following procedure the pulse train equivalent to the machining energy output to the machining power supply 7 by the machining power supply control circuit 8A. First, the pulse width data squaring circuit 28 receives the large and small pulse width data from the NC control device 10A and outputs to the large-small pulse data selection circuit the data found by squaring the corresponding pulse widths. When the pulse width data of the large and small pulses output by the machining power supply control circuit 8A pass through the pulse width data squaring circuit 28, they are converted into data representing energy amounts.

Subsequently, the pulse train generation circuit 13 operates as in the first embodiment to output the pulse train corresponding to the square of the current pulse width of the large/small pulse. For example, assuming that the pulse width data of the large pulse with a width data is 5 and the pulse width data of the small pulse with a low peak is 3, the pulse train generation circuit 13 outputs the pulse train of nine pulses (42a) in response to the small pulse indicated by 32a or the pulse train of 25 pulses (42b) in response to the large pulse indicated by 32b as shown in FIG. 9. Then, the counter circuit 14 also operates as in the first embodiment to measure at intervals of the predetermined time Tp the total number of pulses contained in the pulse trains output by the pulse train generation circuit 13. As described above, since the measurement result of the counter circuit 14 is the sum total of the pulses contained in the pulse trains generated within the predetermined time Tp and the pulse train corresponds to the square of the current pulse width, the energy amounts of current pulses supplied to the machining gap 3 at intervals of predetermined time Tp can be measured precisely without a detection delay. Accordingly, the amount of output energy supplied during machining can be detected, providing effective means for reliably preventing faulty machining such as the wire electrode breakage and centralized arcs.

Subsequently, in the embodiment shown in FIG. 10, the pulse width data multiplying circuit 29 multiplies the pulse width data of the current pulses which the machining power supply control circuit 8A has selected by values corresponding to the peak values of the current pulses, whereby the pulse width data of the current pulses are converted into data representing energy amounts and the pulse train generation circuit 13 operates as in the embodiment shown in FIG. 8 to output the pulse trains equivalent to the energy amounts of the current pulses. Accordingly, the amount of output energy supplied during machining can be detected, providing effective means for reliably preventing faulty machining such as the wire electrode breakage and centralized arcs.

While the application of the current pulses having two different peaks to the machining gap 3 were described in the present embodiment, the application of current pulses having a single peak or a plurality of peaks to the machining gap 3 also allows the energy amounts of current pulses supplied to the machining gap 3 to be measured precisely without a detection delay. Also, the pulse train output by the counter circuit 14 corresponds to the energy amount of the current pulse, whereby when a plurality of current pulses (including two different current pulses) are applied to the machining gap 3, the detection error of the energy amount of the current pulses is smaller than in the first embodiment and the energy amount output during machining can be detected with higher accuracy.

Also, the means in the present embodiment can be used with the one in the second embodiment.

Figure 11:
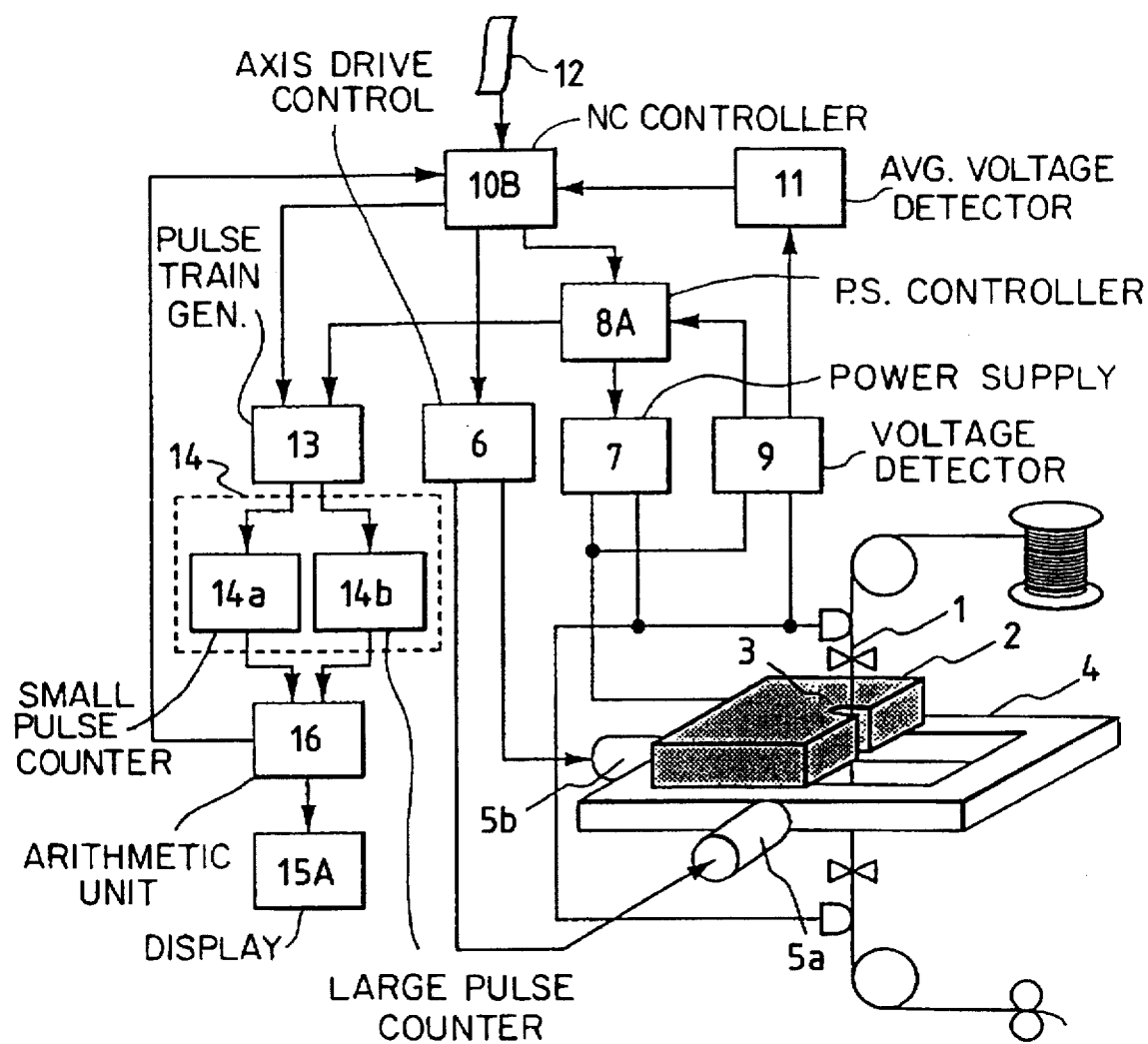
FIG. 11 is a diagram illustrating the arrangement of a wire-cut electric discharge machining apparatus which is a fourth embodiment of the invention.

FIG. 11 shows the construction of an electrical discharge machining apparatus according to a fourth embodiment. In this drawing, 1 to 7, 8A, 9 and 11 to 13 designate parts identical or corresponding to those of the first embodiment, wherein 10B designates an NC control apparatus which receives an NC program and outputs the axis drive command, electrical machining condition parameter data, an electrode feeding speed data and the like. Also, 14 denotes a counter circuit which integrates the number of pulses contained in the pulse trains generated within predetermined time Tp. 14a represents a counter which measures the pulse trains corresponding to the small pulses, 14b indicates a counter which measures the pulse trains corresponding to the large pulses, 16 designates an arithmetic unit which calculates an amount equivalent to the machining energy from the measurement result of said counter circuit 14, and 15A represents a display device which shows the arithmetic result of the arithmetic unit 16 as shown in FIG. 5.

Operation will now be described. The following explanation excludes description as to the same circuit components as those in the first and second embodiments. As in the first embodiment, when two different current waveforms of large pulses with a high peak and small pulses with a low peak are supplied to the machining gap 3 to machine the workpiece, the pulse train generation circuit 13 operates as in the first embodiment to output the pulse train corresponding to the pulse width of the small pulse with a low peak and the pulse train corresponding to the pulse width of the large pulse with a high peak (see 36a and 36b in FIG. 3). During such operation, the two counters 14a and 14b, which constitute the counter circuit 14 to measure the pulse trains of the large and small pulses separately, measure at intervals of the predetermined time Tp the total number of pulses contained in the pulse trains corresponding to the pulse width of the small pulse and the total number of pulses contained in the pulse trains corresponding to the pulse width of the large pulse, respectively, among the pulse trains output by the pulse train generation circuit 13.

Subsequently, the arithmetic unit 16 receives the measurement results of the counter circuits 14a, 14b and performs the following arithmetic, for example, to find machining energy:

Machining energy={[(measurement value of pulse train of large pulses)/(predetermined time)]×(coefficient proportional to peak height of current pulses)}+{[(measurement value of pulse train of small pulses)/(predetermined time)] ×(coefficient proportional to peak height of current pulses)}

Namely, the arithmetic unit 16 multiplies the measurement results of the pulse trains of the large and small pulses generated within the predetermined time Tp by coefficients proportional to the peak heights of the current pulses (which may be coefficients proportional to the pulse widths) and adds the two resultant values, allowing the energy amount of the current pulses supplied to the machining gap 3 at intervals of the predetermined time to be found by arithmetic processing. Accordingly, the energy amount of the current pulses supplied at intervals of the predetermined time Tp as energy output during machining can be detected, providing effective means for reliably preventing faulty machining such as the wire electrode breakage and centralized arc.

While the application of the current pulses having two different peaks to the machining gap 3 were described in the present embodiment, the application of current pulses having a single peak or a plurality of peaks to the machining gap 3 also allows the energy amount of the current pulses supplied to the machining gap 3 at intervals of the predetermined time Tp to be measured by providing one or a plurality of counter circuits 14 according to the number of peak heights of the current pulses. Also, since the counter circuits 14a, 14b in the present embodiment are designed to separately measure the pulse widths of the large and small pulses, respectively, the arrangement of the counter circuit 14 can be simplified.

Also, the arithmetic unit 16 outputs its arithmetic result to the display device 15A. As in the first embodiment, the display device 15A shows the arithmetic result of the arithmetic unit 16 as the energy output during machining to allow the operator to easily judge whether or not the set values of the electrical machining condition parameters, such as the peak value, pulse width, off time, etc. of the current pulses, are appropriate, whereby it is possible to prevent the wire breakage from occurring. In addition, the machining conditions can be selected easily to reduce the operator burden.

Also, the arithmetic unit 16 performs arithmetic on the energy amount of the current pulses supplied to the machining gap 3 at intervals of the predetermined time Tp from the measurement results of the counter circuit 14 and outputs the arithmetic result to the NC control apparatus 10B. The NC control apparatus 10B changes and controls the electrical machining condition parameters to be output to the machining power supply control circuit 8B according to the arithmetic result of the arithmetic unit 16. For example, when the energy of the current pulses generated within the predetermined time is high, the NC control apparatus 10B judges that the energy output to the wire electrode is high, and changes the set values of the electrical machining condition parameters, such as a current pulse off duration, to reduce the total number of pulses contained in the pulse trains generated within the predetermined time Tp. Conversely, when the energy of the pulse trains generated within the predetermined time is low, the NC control apparatus 10B changes the set values of the electrical machining condition parameters to increase the total number of pulses contained in the pulse trains generated within the predetermined time Tp. This allows the amount of the energy output during machining to be detected and the output energy to be controlled according to the machining conditions, whereby faulty machining such as the wire electrode breakage and centralized arcs can be prevented reliably.

It is to be understood that the pulse train generation circuit 13 used in the fourth embodiment may be the pulse train generation circuit 13, as described in said second embodiment, which outputs the pulse train corresponding to the machining current supplying duration in the time zone after the supply of the machining current has stopped. In this case, the influence of noise caused by electrical discharge machining can be avoided to enable the output energy to be detected with higher accuracy.

Figure 12:
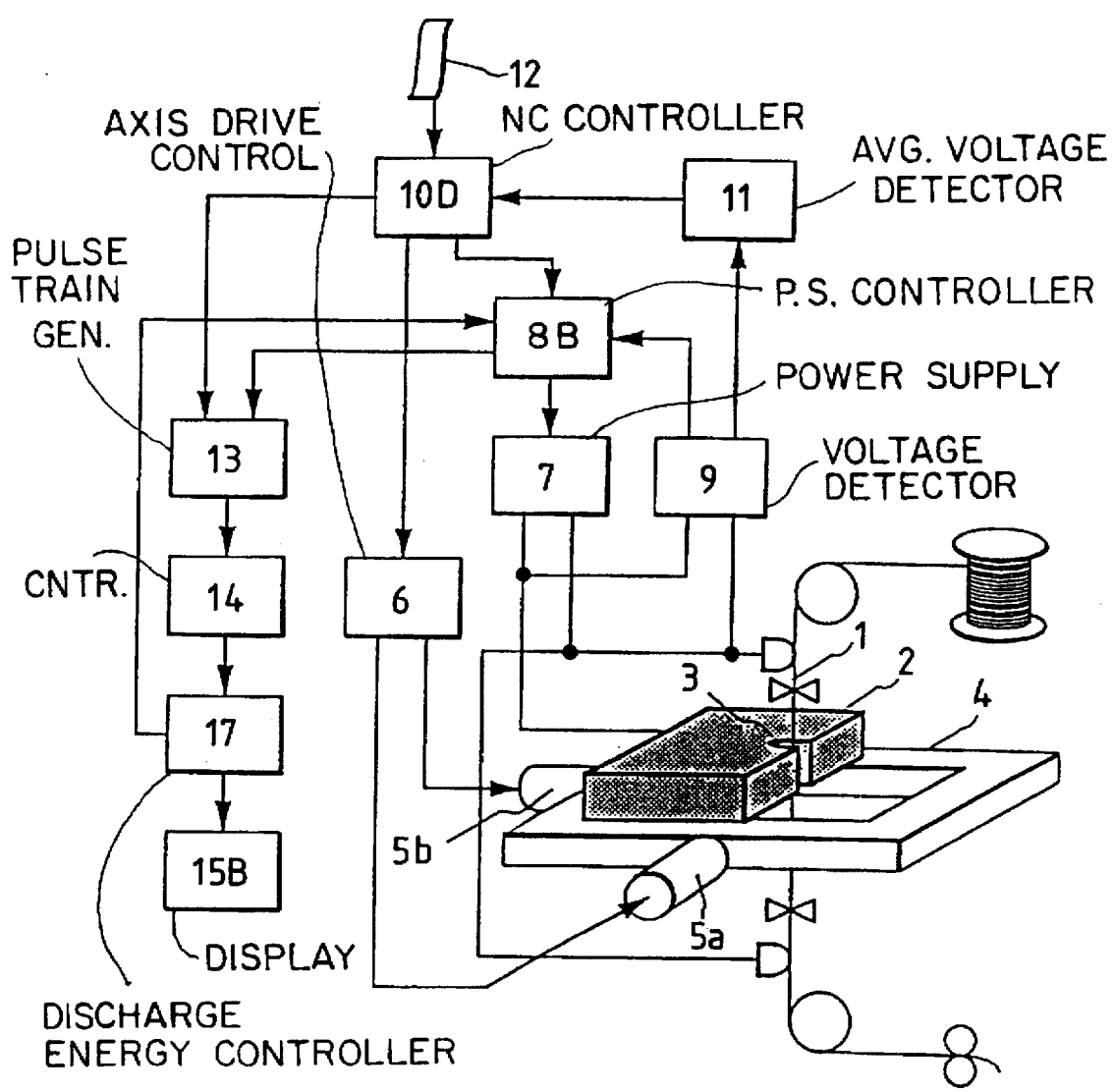
FIG. 12 is a diagram illustrating the arrangement of a fifth embodiment.

FIG. 12 shows an electrical discharge machining apparatus according to a fifth embodiment. In this drawing, 1 to 7, 9, 12, 13 and 14 designate parts identical or corresponding to those of the first embodiment, wherein 8B indicates a machining power control device which is controlled by an NC control apparatus 10D and a discharge energy control apparatus 17 which will be described in detail hereinafter; 10D, the NC control apparatus which receives an NC program and outputs the axis drive command, electrical machining condition parameter information, electrode feedrate, etc., 17 denotes a discharge energy control apparatus which controls a machining power supply control circuit 8B, that controls the electrical machining condition parameters such as the off time and current pulse width, to keep the measurement result of said counter circuit 14 constant, and 15B represents a display device which shows the arithmetic result of the discharge energy control apparatus 17 as shown in FIG. 5, for example.

Operation which is different from that of the first embodiment will now be described. As in the first embodiment, when two different current waveforms of large pulses with a high peak and small pulses with a low peak are supplied to the machining gap 3 to machine the workpiece, the pulse train generation circuit 13 outputs the pulse train corresponding to the pulse width output to the machining power supply 7 by the machining power supply control circuit 8B, and the counter circuit 14 measures at intervals of the predetermined time Tp the total number of pulse trains output by the pulse train generation circuit 13. The discharge energy control apparatus 17 compares the set value of the pulse count predetermined according to conditions, such as a wire electrode diameter and a workpiece to be machined, with the measurement result of the counter circuit 14 and changes the current peak, pulse width and off time in the electrical machining condition parameters controlled by the machining power supply control circuit 8B according to said result to keep the measurement result of the counter circuit 14 constant.

Accordingly, because the amount of the current pulse supplied to the machining gap 3 at intervals of the predetermined time is controlled to be constant, the amount of the energy output during machining is rendered constant, whereby faulty machining such as the wire electrode breakage and centralized arcs can be prevented reliably. Also, the pulse train output by the pulse train generation circuit 13 is output during the off time as in the second embodiment to avoid the influence of noise generated by electrical discharge machining and to detect the output energy with higher accuracy, whereby the reliability of operation to prevent wire breakage can be much improved. Further, when the pulse train generation circuit 13 outputs the pulse train equivalent to the machining energy as in the third embodiment, the discharge energy control apparatus 17 can exercise control to keep the measurement result of the counter circuit 14 constant.

Figure 13:
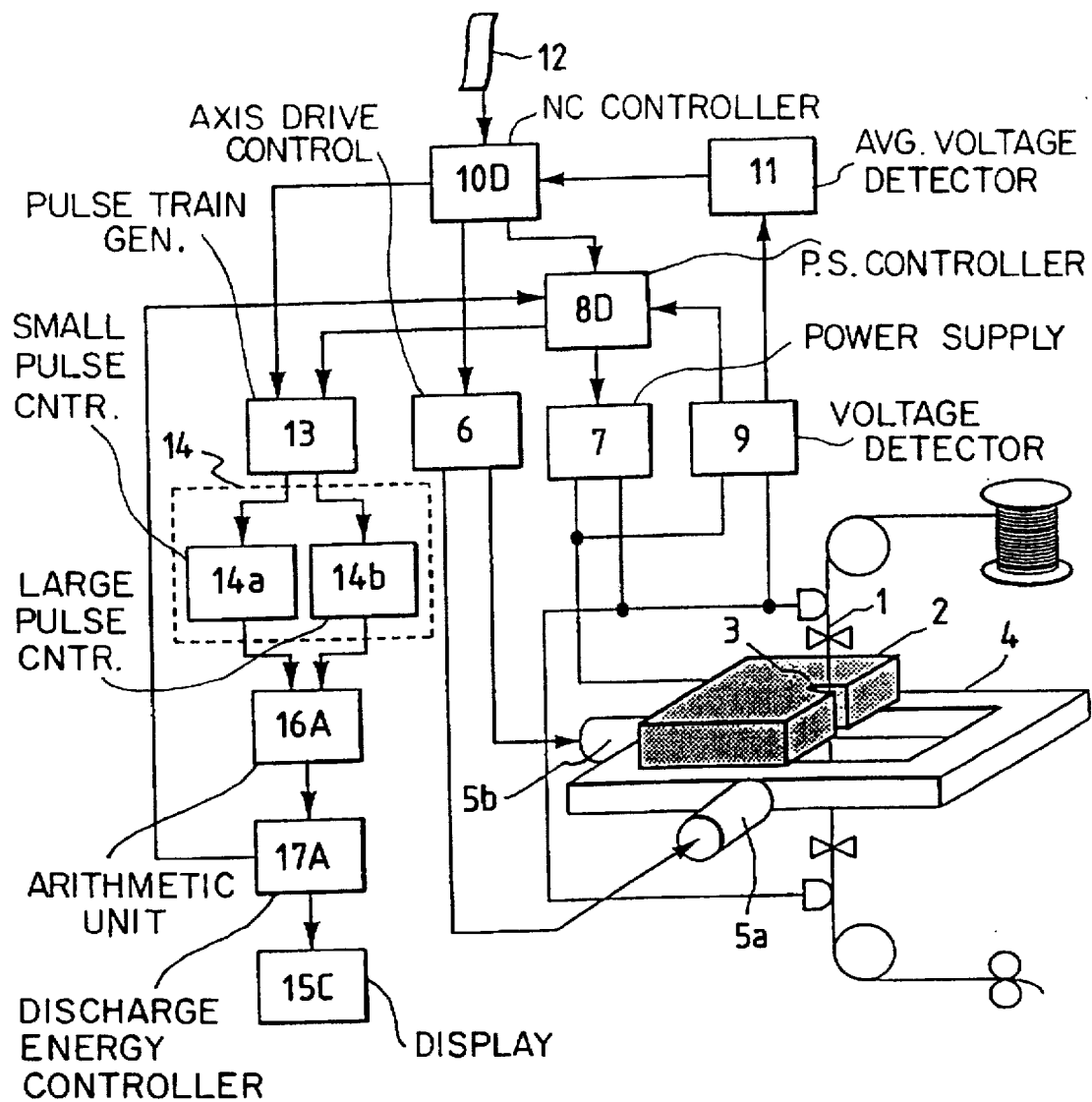
FIG. 13 is a diagram illustrating the arrangement of a sixth embodiment.

FIG. 13 shows an electrical discharge machining apparatus according to a sixth embodiment. In this drawing, 1 to 7, 9, 10D and 11 to 13 designate parts identical or corresponding to those of the fifth embodiment, wherein 8D designates a machining power control circuit which is controlled by an NC control apparatus 10d and a discharge energy control apparatus 17A; 14, a counter circuit which integrates the number of said pulses contained in the trains generated within predetermined time, 14a represents a counter which measures the pulse trains corresponding to the small pulses, 14b indicates a counter which measures the pulse trains corresponding to the large pulses, 16A designates an arithmetic unit which calculates an amount equivalent to the machining energy from the measurement result of said counter circuit 14, and 17A represents a discharge energy control apparatus which receives the output signal of the arithmetic unit 16A and controls the machining power supply control circuit 8D. 15C designates a display device for displaying arithmetic operation result of the discharge energy control apparatus 17A as shown in FIG. 5.

Operation will now be described. The workpiece is machined as in the fifth embodiment, and the arithmetic unit 16A performs arithmetic on the energy amount of the current pulse supplied to the machining gap 3 at intervals of the predetermined time Tp from the measurement result of the counter circuit 14 and outputs the arithmetic result to the discharge energy control apparatus 17A, which is similar to the operation of the fourth embodiment. As in the fifth embodiment, the discharge energy control apparatus 17A compares the set value of the pulse count representing machining energy, which is predetermined according to conditions, such as a wire electrode diameter and a workpiece to be machined, with the arithmetic result of the arithmetic unit 16A and changes the current peak, pulse width and off time in the electrical machining condition parameters controlled by the machining power supply control circuit 8A according to said result to keep the arithmetic result of the arithmetic unit 16A constant. Accordingly, since the amount of the current pulse supplied to the machining gap 3 at intervals of the predetermined time Tp is controlled to be constant, the amount of the energy output during machining is rendered constant, whereby faulty machining such as the wire electrode breakage and centralized arcs can be prevented reliably.

Also, the pulse train output by the pulse train generation circuit 13 is output during the off time as in the second embodiment to avoid the influence of noise generated by electrical discharge machining and to detect the output energy with higher accuracy, whereby the reliability of operation to prevent wire breakage can be much improved. In addition, since the counter circuits 14a, 14b in the present embodiment are designed to separately measure the pulse widths of the large and small pulses, respectively, the arrangement of the counter circuit 14 can be simplified.

Figure 14A:
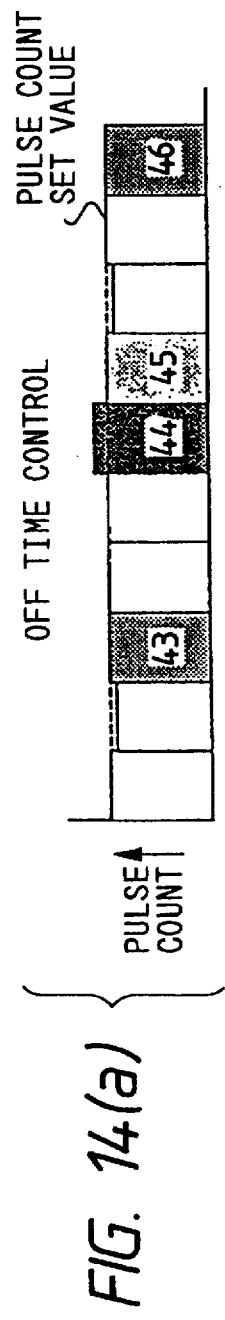
FIG. 14(a) shows a timing diagram illustrating pulse count totals for subsequent segments of time of a predetermined amount Tp, according to the operation of a seventh embodiment.
Figure 14B:
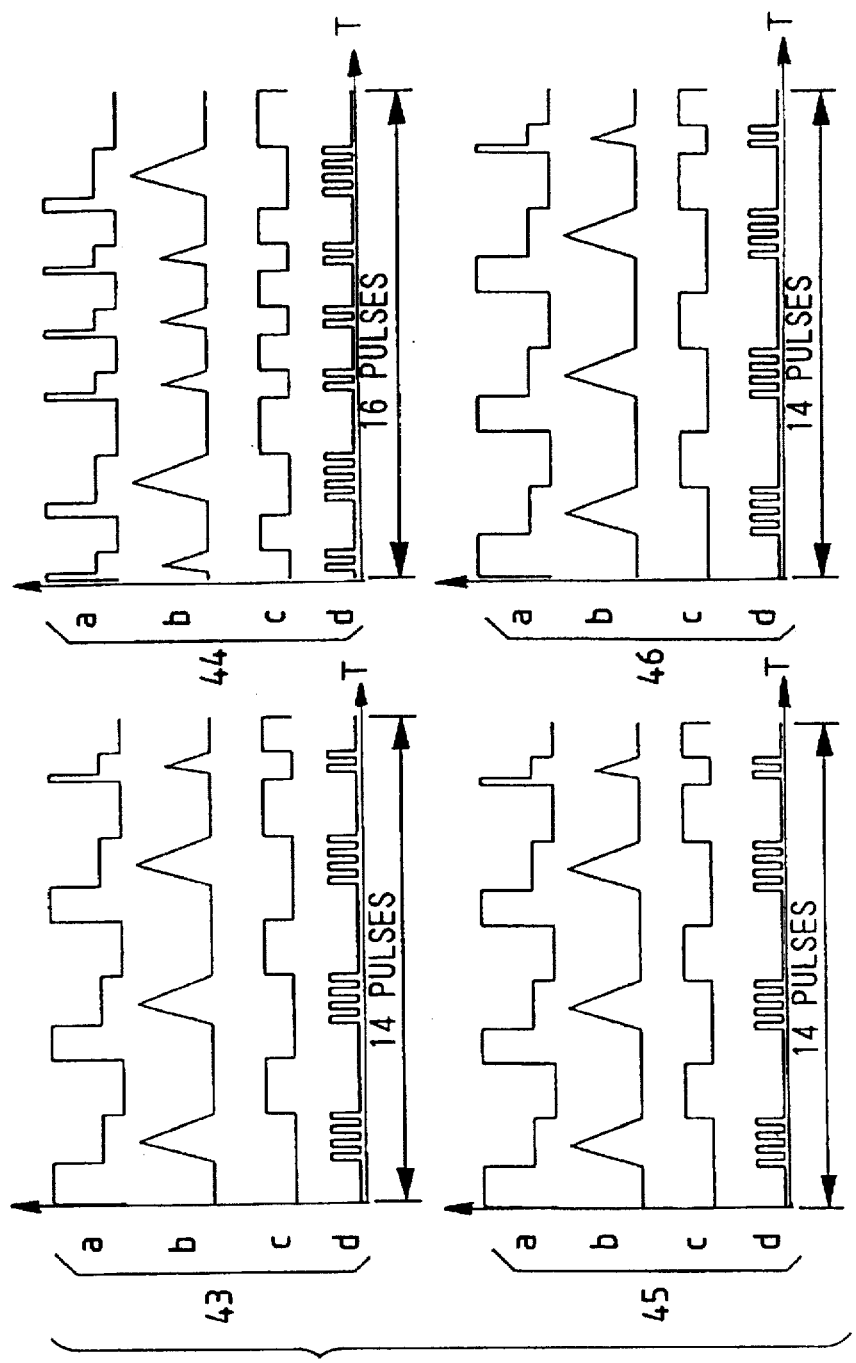
FIG. 14(b) shows timing diagrams illustrating the counting of pulses within each of four segments of time of a predetermined amount Tp, according to the operation of a seventh embodiment.

FIGS. 14(a) and 14(b) show an example of how the discharge energy control apparatus 17 in the electrical discharge machining apparatus according to said fifth embodiment shown in FIG. 12 or the sixth embodiment shown in FIG. 13 controls the off time, one of the electrical machining condition parameters, to keep the measurement result of the counter circuit 14 constant. FIG. 14(a) shows the measurement result of the counter circuit 14 within the predetermined time Tp, and FIG. 14(b) gives timing charts corresponding to regions 43 to 46 in (a), showing discharge waveforms formed at the machining gap 3 within the predetermined time, off time controlled by the discharge energy control apparatus, and pulse trains output by the pulse train generation circuit 13. In each of 43 to 46, a indicates a discharge voltage waveform, b denotes a discharge current waveform, C designates off time, and d represents a pulse train operation will now be described. The workpiece is machined as in the fifth embodiment, and the counter circuit 14 measures at intervals of the predetermined time Tp the total number of pulses contained in the pulse trains corresponding to the pulse widths of the current pulses supplied to the machining gap 3 and outputs the measurement result to the discharge energy control apparatus 17. The discharge energy control apparatus 17 compares the set value of the pulse count predetermined according to the conditions, such as the wire electrode diameter and the workpiece to be machined, with the measurement result of the counter circuit 14 and changes the off time controlled by the machining power supply control circuit 8B according to said result to keep the measurement result of the counter circuit 14 constant.

An operation example of the off time control exercised by the discharge energy control apparatus 17 will now be described. For instance, assume that the set value of the pulse count within the predetermined time is 14 pulses in the discharge energy control apparatus 17 and the measurement result of the pulse count of the counter circuit 14 changes as shown in FIG. 14(a). First, in the machining status at step 43 in FIG. 14(b), the off time remains unchanged since the measurement result of the pulse count is 14 pulses as indicated by 43d and is equal to the set value of the pulse count of the discharge energy control apparatus 17. Subsequently, when the state of the machining gap 3 changes to a state close to wire breakage at step 44 in FIG. 14(b), the then measurement result of the pulse count increases to 16 pulses as indicated by 44d and exceeds the set value of the pulse count of the discharge energy control apparatus 17, whereby the discharge energy control apparatus 17 outputs to the machining power supply control circuit 8B a signal to increase the off time.

In the machining status at next step 45 in FIG. 14(b), which reflects the control of the off time, the off time increases as indicated by 45c, and the number of discharges generated within the predetermined time Tp decreases. As a result, wire breakage is avoided and the measured value of the pulse count within the predetermined time reduces to a predetermined 14 pulses as indicated by 45d. As shown in the figure, when the measured value thereof is reduced less than the predetermined set value 14 in the step following the step 45, the discharge energy control apparatus 17 outputs a signal to the machining power control circuit 8B so as to shorten a pause period of time. Consequently, the measured value thereof is increased to the predetermined set value in the next step.

In the above cycle, the discharge energy control apparatus 17 controls the pause time controlled by the machining power supply control circuit 8B, to prevent the occurrence of faulty discharges and wire breakage, whereby faulty discharges and wire breakage can be avoided reliably and a stable machining status is maintained.

It should be noted that the operation of the discharge energy control device 17A which is shown in FIG. 13 showing the sixth embodiment is substantially same as that of the discharge energy control device 17 of the fifth embodiment.

Figure 15A:
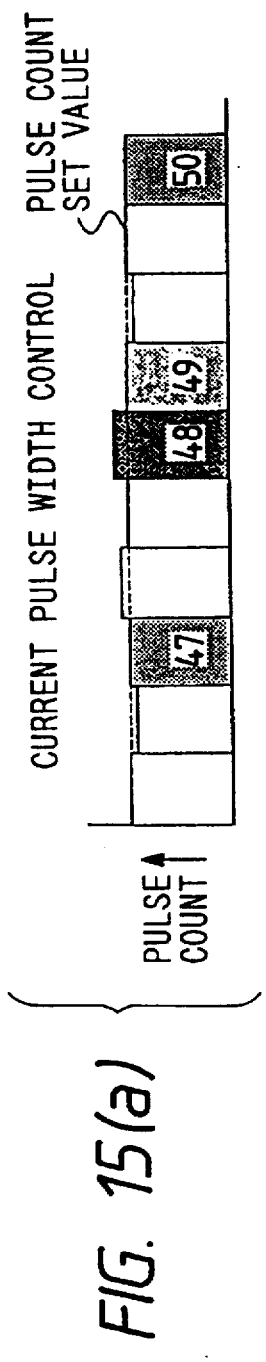
FIG. 15(a) shows a timing diagram illustrating pulse count totals for subsequent segments of time of a predetermined amount Tp, according to the operation of a seventh embodiment.
Figure 15B:
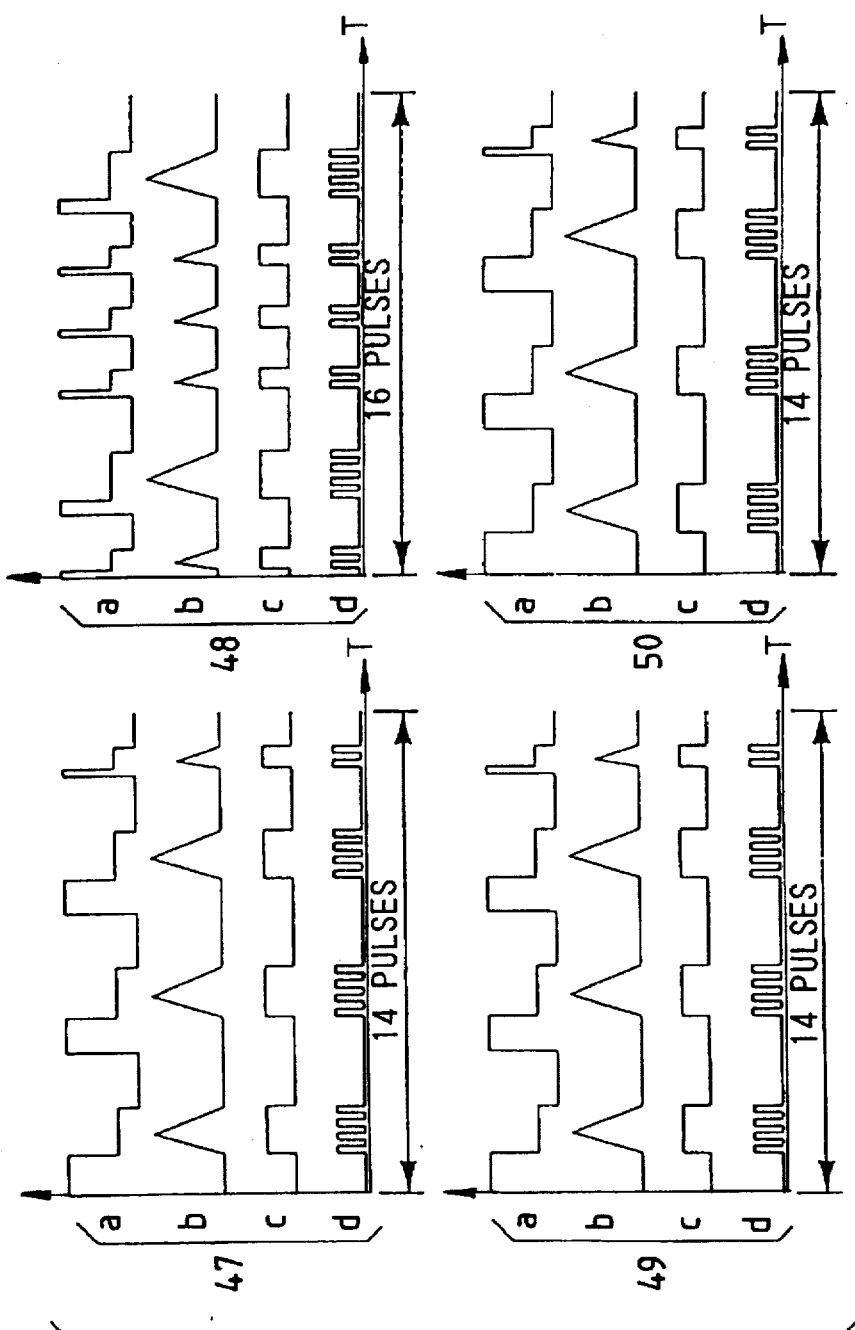
FIG. 15(b) show timing diagrams illustrating the counting of pulses within each of four segments of time of a predetermined amount Tp, according to the operation of an eighth embodiment.

FIGS. 15(a) and 15(b) show an example of how the discharge energy control apparatus 17 or 17A in the electrical discharge machining apparatus according to said fifth embodiment shown in FIG. 12 controls the current pulse width, one of the electrical machining condition parameters, to keep the measurement result of the counter circuit 14 constant. FIG. 15(a) shows the measurement result of the counter circuit 14 within the predetermined time Tp, and FIG. 15(b) gives timing charts corresponding to regions 47 to 50 in (a), showing discharge waveforms formed at the machining gap 3 within the predetermined time, current pulse widths controlled by the discharge energy control apparatus, and pulse trains output by the pulse train generation circuit 13. In each of 47 to 50, a indicates a discharge voltage waveform, b denotes a discharge current waveform, c designates a current pulse width, and d represents a pulse train.

Operation will now be described. The workpiece is machined as in the fifth embodiment, and the counter circuit 14 measures at intervals of the predetermined time Tp the total number of pulses contained in the pulse trains corresponding to the pulse widths of the current pulses supplied to the machining gap 3 and outputs the measurement result to the discharge energy control apparatus 17, 17A. The discharge energy control apparatus 17 compares the set value of the pulse count predetermined according to the conditions, such as the wire electrode diameter and the workpiece to be machined, with the measurement result of the counter circuit 14 and changes the current pulse width controlled by the machining power supply control circuit 8B, according to said result to exercise control to keep the measurement result of the counter circuit 14 constant.

An operation example of the current pulse width control exercised by the discharge energy control apparatus 17 will now be described. For instance, assume that the set value of the pulse count within the predetermined time Tp is 14 pulses in the discharge energy control apparatus 17 and the measurement result of the pulse count of the counter circuit 14 changes as shown in FIG. 15(a). First, in the machining status at step 47, the current pulse width remains unchanged since the measurement result of the pulse count is 14 pulses as indicated by 47d and is equal to the set value of the pulse count of the discharge energy control apparatus 17. Subsequently, when the status of the machining gap 3 changes to a state close to wire breakage at step 48, the then measurement result of the pulse count increases to 16 pulses as indicated by 48d and exceeds the set value of the pulse count of the discharge energy control apparatus 17, whereby the discharge energy control apparatus 17 outputs to the machining power supply control circuit 8B a signal to decrease the current pulse width. In the machining status at next step 49, which reflects the control of the current pulse width, the current pulse width decreases as indicated by 49c, and at the same time, the peak value of the current pulse reduces.

As a result, wire breakage is avoided and the measured value of the pulse count within the predetermined time Tp reduces to a predetermined set value, 14 pulses as indicated by 49c. Thereafter, when the measurement result of the pulse count is less than the set value thereof, the discharge energy control apparatus 17 output a signal to the machining power control circuit 8B so as to make the current pulse width longer whereby the measure value thereof returns the predetermined set value 14 in the following step.

In the above cycle, the discharge energy control apparatus 17 controls the current pulse width controlled by the machining power supply control circuit 8B to prevent the occurrence of faulty discharges and wire breakage, whereby faulty discharges and wire breakage can be avoided reliably and a stable machining status is maintained.

The operation of the discharge energy control device 17A shown in FIG. 13 showing the sixth embodiment is substantially same as that of the same device 15 of the fifth embodiment of the invention.

Figure 16:
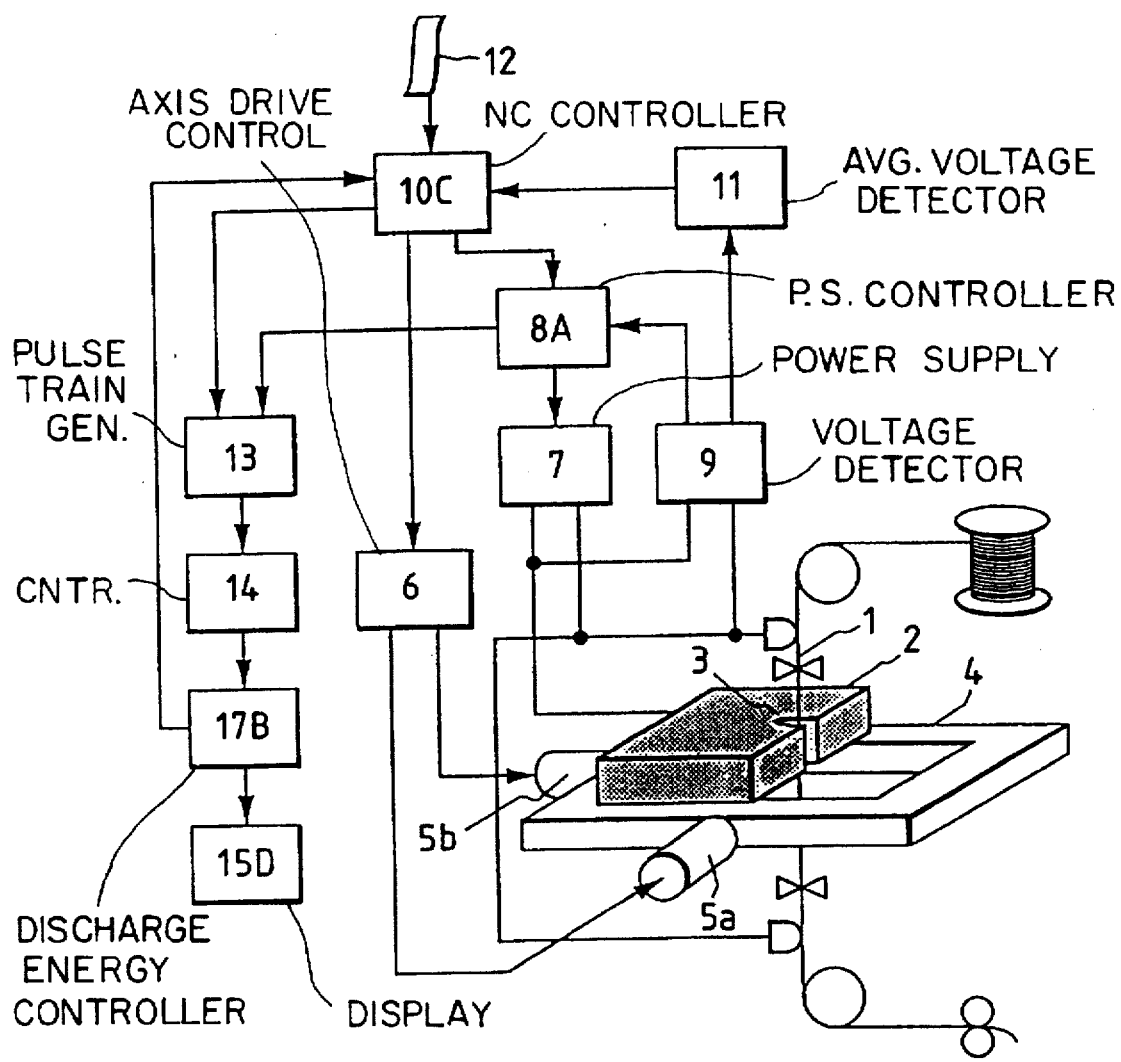
FIG. 16 is a diagram illustrating the arrangement of a ninth embodiment.

FIG. 16 shows an electrical discharge machining apparatus according to a ninth embodiment. In this drawing, 1 to 7, 8A, 9 and 11 to 14 designate parts identical or corresponding to those of the fifth embodiment, wherein 17B indicates a discharge energy control apparatus which controls an NC control apparatus 10C to control the electrode feedrate. 15D designates a display device for displaying the arithmetic result of the discharge energy control device 17B as shown in FIG. 5.

Figures 17A, 17B:
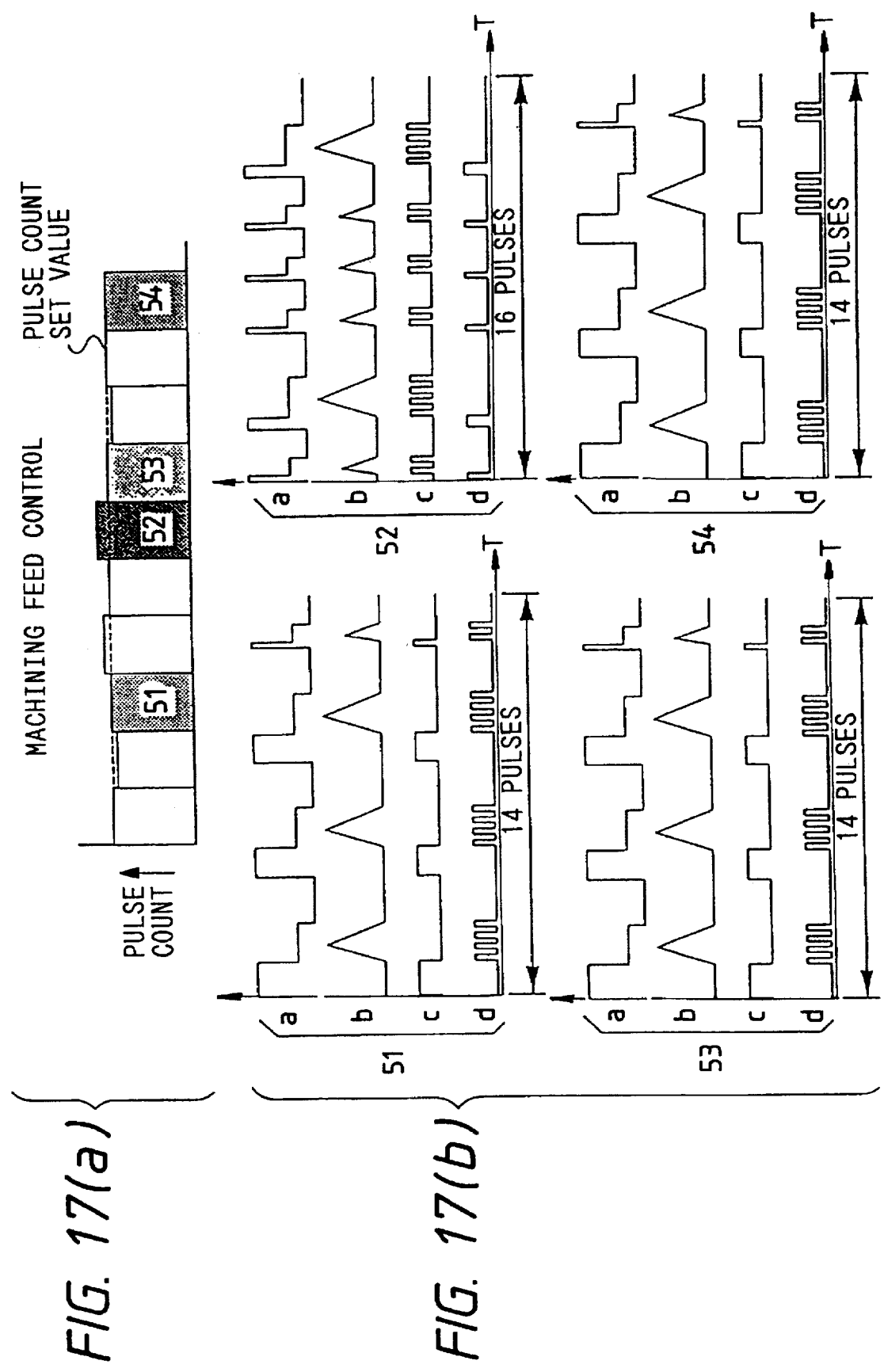
FIG. 17(a) shows a timing diagram illustrating pulse count totals for subsequent segments of time of a predetermined amount Tp, according to the operation of the ninth embodiment.
FIG. 17(b) shows timing diagrams -illustrating the counting of pulses within each of four segments of time of a predetermined amount Tp, according to the operation of the ninth embodiment.

FIGS. 17(a) and 17(b) show an example of how the electrode feedrate is controlled in the present embodiment. FIG. 17(a) shows the measurement result of the counter circuit 14 within the predetermined time, and FIG. 17(b) gives timing charts corresponding to regions 51 to 54 in (a), showing discharge waveforms formed at the machining gap 3 within the predetermined time Tp, no-load time (time between voltage application and discharge occurrence) changed by electrode feedrate control, and pulse trains output by the pulse train generation circuit 13. In each of 51 to 54, a indicates a discharge voltage waveform, b denotes a discharge current waveform, c designates no-load time, and d represents a pulse train.

Operation will now be described. The workpiece is machined as in the fifth embodiment, and the counter circuit 14 measures at intervals of the predetermined time Tp the total number of pulses contained in the pulse trains corresponding to the pulse widths of the current pulses supplied to the machining gap 3 and outputs the measurement result to the discharge energy control apparatus 17B. The discharge energy control apparatus 17B compares the set value of the pulse count predetermined according to the conditions, such as the wire electrode diameter and the workpiece to be machined, with the measurement result of the counter circuit 14 and changes the electrode feedrate controlled by the NC control apparatus 10C according to said result to keep the measurement result of the counter circuit 14 constant.

An operation example of the electrode feedrate control exercised by the discharge energy control apparatus 17B will now be described. For instance, assume that the set value of the pulse count within the predetermined time Tp is 14 pulses in the discharge energy control apparatus 17B and the measurement result of the pulse count of the counter circuit 14 changes as shown in FIG. 17(a). First, in the machining status at step 51, since the measurement result of the pulse count is 14 pulses as indicated by 51d and is equal to the set value of the pulse count of the discharge energy control apparatus 17B, the electrode feedrate remains unchanged and the no-load time is also unchanged. Subsequently, when the status of the machining gap 3 changes to a state close to wire breakage at step 52, the then measurement result of the pulse count increases to 16 pulses as indicated by 52d and exceeds the set value of the pulse count of the discharge energy control apparatus 17B, whereby the discharge energy control apparatus 17B outputs a signal to a NC control circuit 10C to decrease the electrode feedrate. In the machining status at next step 53, which reflects the control of the electrode feedrate, the no-load time increases as indicated by 53c, and therefore, the number of discharges occurring within the predetermined time Tp reduces. As a result, wire breakage is avoided and the measured value of the pulse count within the predetermined time Tp reduces to 14 pulses as indicated by 53d. Thereafter, when the measurement result of the pulse count is less than the set value of the pulse count in the next step following the step 53, the discharge energy control apparatus 17B outputs a signal to the NC control device 10C to increase the electrode feedrate. Consequently, the measured value is returned to 14 pulses in the next step.

In the above cycle, the discharge energy control apparatus 17B controls the NC control device 10C so as to control the electrode feedrate to thereby prevent the occurrence of faulty discharges and wire breakage, whereby faulty discharges and wire breakage can be avoided reliably and a stable machining status is maintained.

Figure 18:
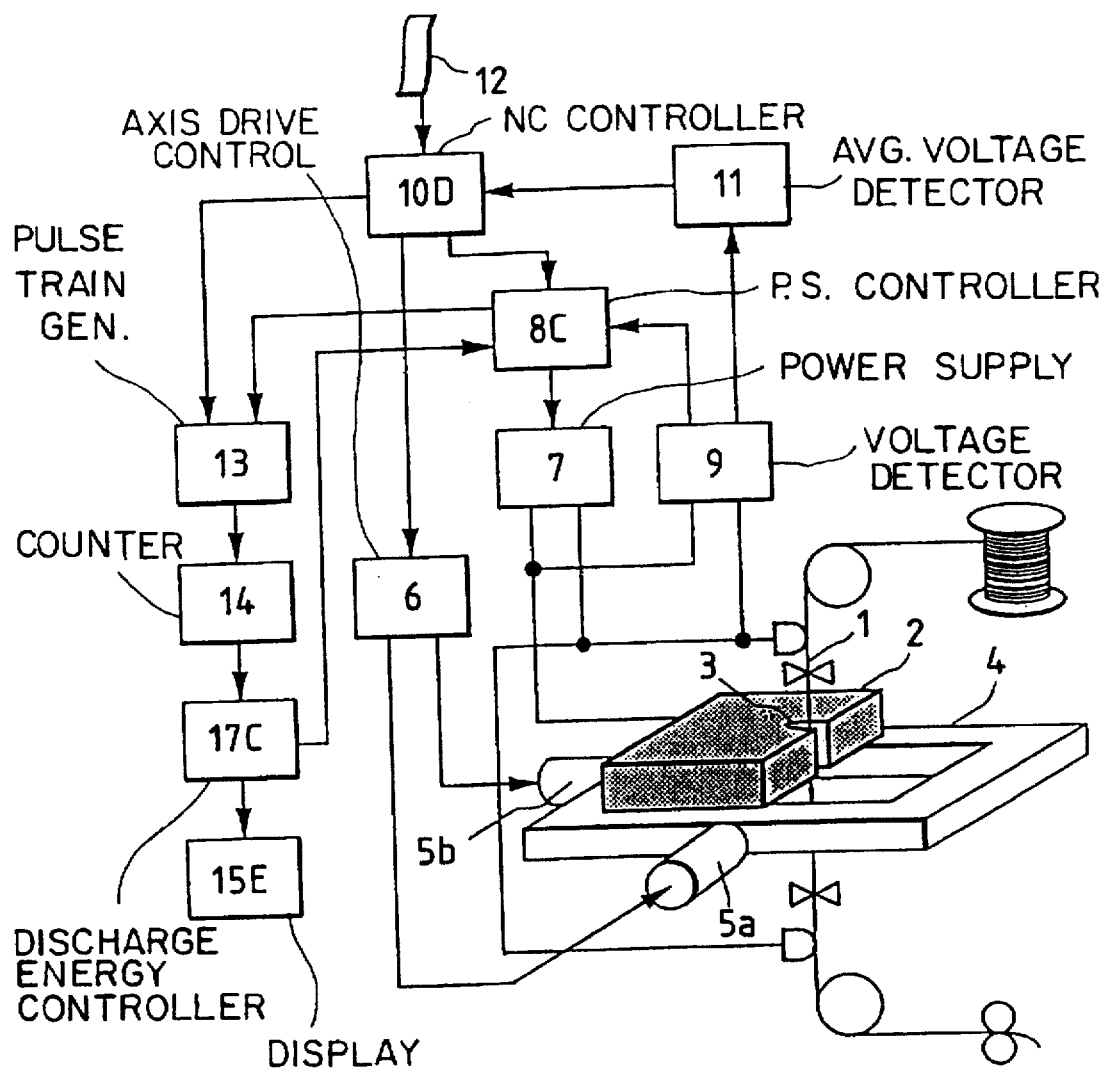
FIG. 18 is a diagram illustrating the arrangement of a tenth embodiment.

The tenth embodiment of the invention will be described with reference to FIGS. 18, 19(a), and 19(b). FIG. 18 shows an electrical discharge machining apparatus according to a tenth embodiment. In this drawing, 1 to 7 and 9, 10D, 11 to 14 designate parts identical or corresponding to those of the fifth embodiment, wherein 17C indicates a discharge energy control apparatus which controls a machining power supply control circuit 8B to keep the number of pulses generated within the predetermined time Tp less than a predetermined value by stopping the supply of machining current pulses (or machining voltage current pulses) if the measurement result of the counter circuit 14 has reached the predetermined value. 15E designates a display for displaying the arithmetic result of the discharge energy control device 17C as shown in FIG. 5.

Figure 19:
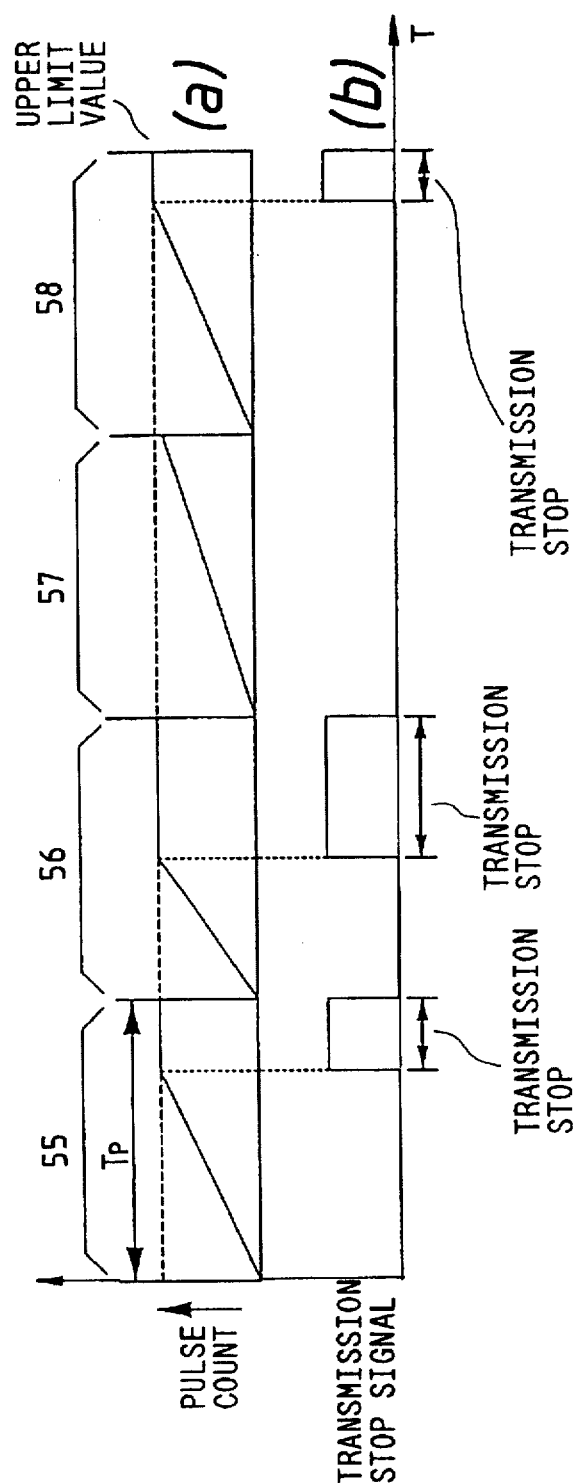
FIG. 19 shows two timing diagrams. Timing diagram (a) illustrates the ramp signal of pulse integration result during subsequent time periods Tp, according to the operation of the tenth embodiment; diagram (b) illustrates the transmission stop signal according to the operation of the tenth embodiment.

FIGS. 19(a) and 19(b) show an example of how the discharge energy control apparatus 17C in the tenth embodiment exercises control. FIG. 19(a) shows the measurement result of the counter circuit 14 in the predetermined time Tp, and FIG. 19(b) is a timing chart of a current pulse supply stop signal (hereinafter referred to as the "transmission stop signal").

Operation will now be described. As in the first embodiment, when two different current waveforms of large pulses with a high peak and small pulses with a low peak are supplied to the machining gap 3 to machine the workpiece, the pulse train generation circuit 13 outputs the pulse train corresponding to the pulse width output to the machining power supply 7 by the machining power supply control circuit 8C, and the counter circuit 14 measures at intervals of the predetermined time Tp the total number of pulses contained in the pulse trains output by the pulse train generation circuit 13. The discharge energy control apparatus 17C compares the measurement result of the counter circuit 14 with the predetermined value (upper limit value) of the pulse count preset according to the conditions, such as the wire electrode diameter and the workpiece to be machined. If the measurement result of the pulse count has reached the predetermined value within the predetermined time (55, 56, 58 in FIG. 19(a)), the discharge energy control apparatus 17C stops the drive signal output to the machining power supply 7 by the machining power supply control circuit 8C, outputs to the machining power supply control circuit 8C the transmission stop signal (FIG. 19(b)) which stops the supply of the current pulse once to keep the measurement result of the pulse count within the predetermined time Tp less than the predetermined value (upper limit value).

If the measurement result of the pulse count does not reach the predetermined value (upper limit value) within the predetermined time Tp as in (57) in FIG. 19(a), the discharge energy control apparatus 17C does not output the transmission stop signal. Accordingly, the amount of current pulses supplied to the machining gap 3 at intervals of the predetermined time Tp is limited to the predetermined value (upper limit value) by the control operation of the discharge energy control apparatus 17C, whereby the amount of energy output during machining is controlled to be less than the limit value of wire breakage, providing effective means for reliably preventing faulty machining such as wire electrode breakage and centralized arcs. Also, the pulse train output by the pulse train generation circuit 13 is output during the off time as in the second embodiment to avoid the influence of noise generated by electrical discharge machining and to detect the output energy with higher accuracy, whereby the reliability of operation to prevent wire breakage can be much improved. Further, when the pulse train generation circuit 13 outputs the pulse train equivalent to the machining energy as in the third embodiment, the discharge energy control apparatus 17C can exercise control to keep the measurement result of the counter circuit 14 less than the predetermined value (upper limit value).

A specific example of effects produced by the apparatus concerned with said present embodiment will be described below. When wire-cut electrical discharge machining was carried out by the apparatus concerned with the present embodiment under the following conditions:

Wire electrode: Brass, 0.3 mm diameter

Workpiece: SKD11, 60 mm thickness

Peak current: 600A

Predetermined time of the counter circuit 14: 10 ms

The machining speed was 4.2 mm/min., which improved approximately 20% as compared to the conventional machining speed (3.6 mm/min.), and no wire breakage occurred.

Figure 20:
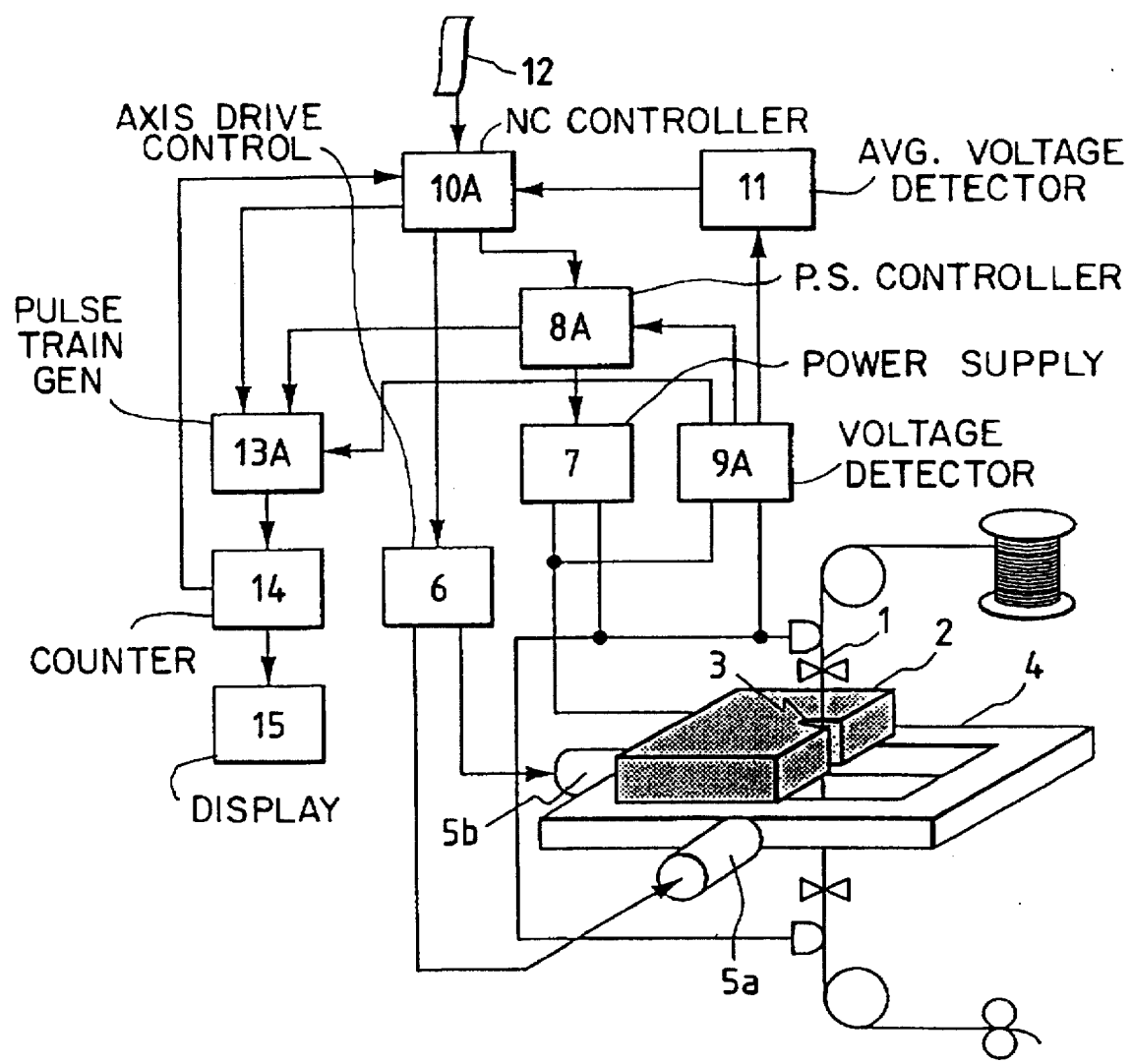
FIG. 20 is a diagram illustrating the arrangement of an eleventh embodiment.

FIG. 20 shows an electrical discharge machining apparatus according to an eleventh embodiment. In this drawing, 1 to 7, 8A, 10A, 11, 12, 14 and 15 designate parts identical or corresponding to those of the first embodiment, wherein 13A indicates a pulse train generation circuit which receives the detected value by the voltage detection circuit 9A for detecting the machining voltage in the interelectrode gap and outputs a pulse train corresponding to the current pulse width of the current pulse waveform applied to the machining gap only when the value detected by the voltage detection circuit 9 is not less than the predetermined level of voltage value representing a valid discharge at the machining gap, and 14 denotes a counter circuit which integrates the number of said pulse trains generated within the predetermined time Tp.

Figure 21A:
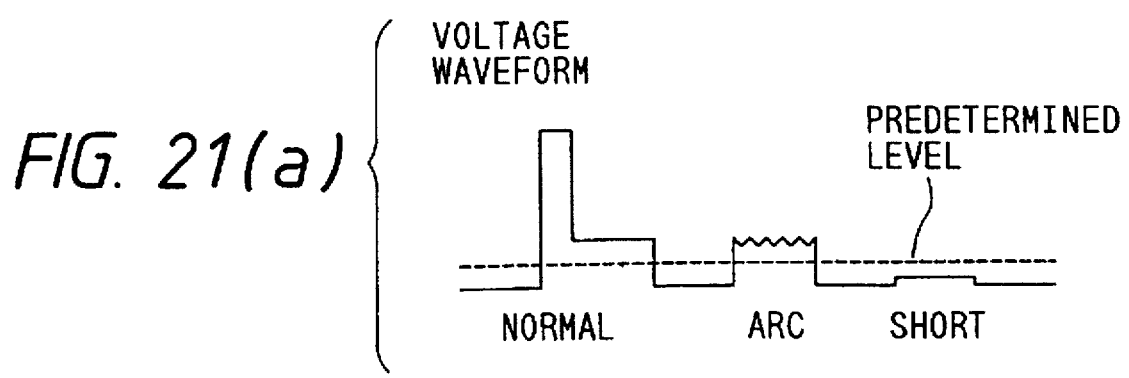
FIG. 21(a) and 21(b) show waveform diagrams illustrating the operation of the eleventh embodiment.
Figure 21B:
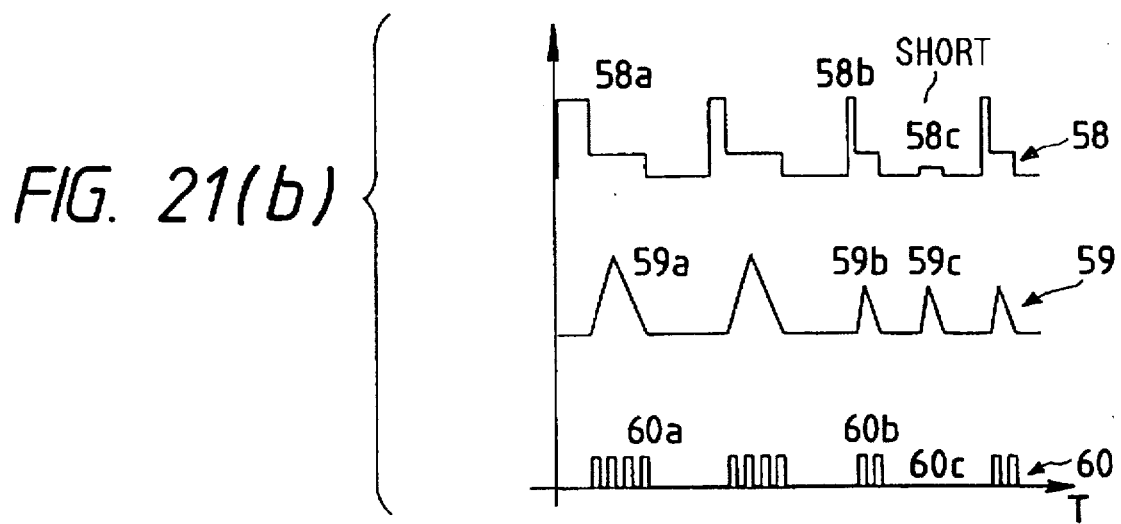
Figure 22:
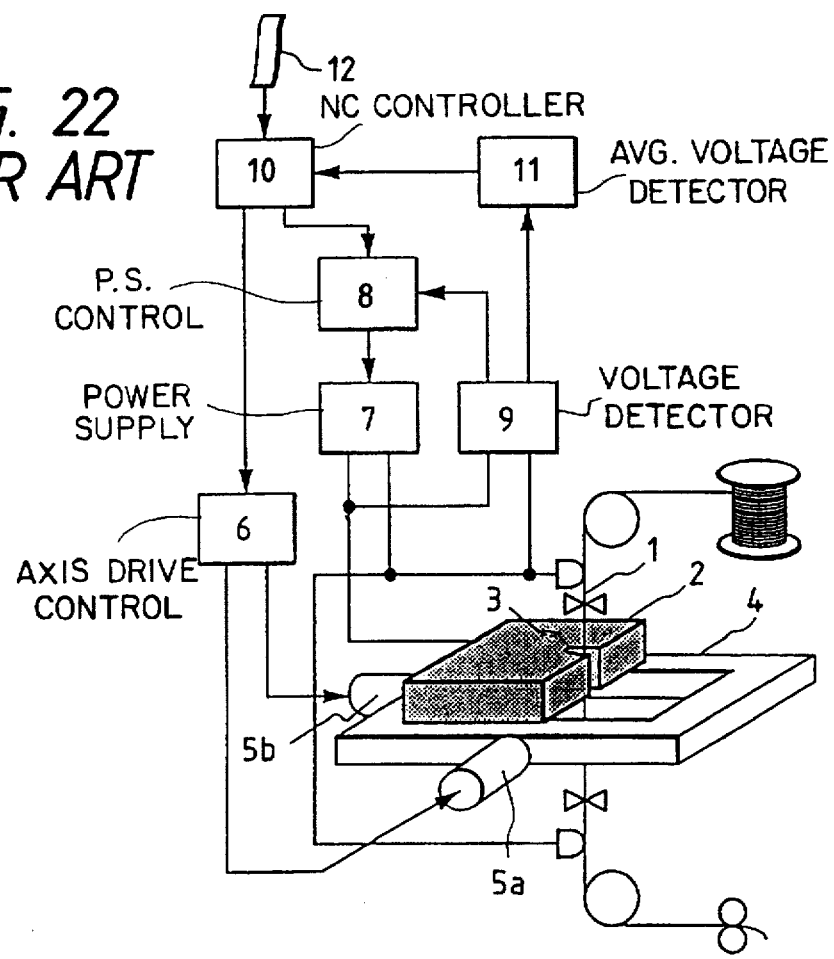
FIG. 22 is a diagram illustrating a conventional example.
Figure 23:
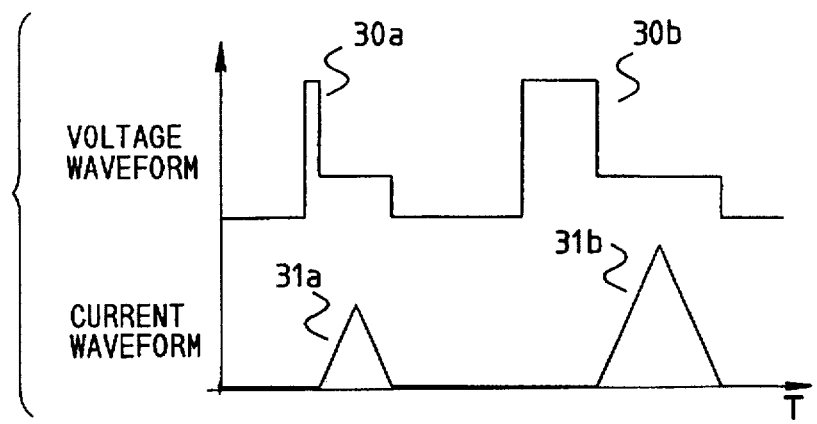
FIG. 23 is a diagram illustrating the operation of the conventional example.

FIGS. 21(a) and 21(b) show the operation of the wire-cut electrical discharge machining apparatus in the eleventh embodiment. FIG. 21(a) shows a relationship between a machining gap state and a discharge voltage, and FIG. 21(b) shows discharge waveforms at the machining gap and pulse trains output by the pulse train generation circuit 13A, wherein 58 indicates a discharge voltage waveform, 59 represents a discharge current waveform, and 60 designates a pulse train.

Operation will now be described. As in the first embodiment, when two different current waveforms of large pulses with a high peak and small pulses with a low peak are supplied to the machining gap 3 to machine the workpiece, the voltage detection circuit 9A detects the generation of a discharge according to the voltage waveform at the machining gap 3 and also measures the no-load time and outputs the result of this measurement to the machining power supply control circuit 8A. If the no-load time is short (immediate discharge), the machining power supply control circuit 8A supplies the current waveform of small pulse width and low peak. Conversely, if the no-load time is relatively long, the machining power supply control circuit 8 judges it as a normal discharge and supplies the current waveform of large pulse width and high peak. The average detection circuit 11 detects the average voltage during machining and carries out electrode feed control in accordance with this voltage. The pulse train generation circuit 13A outputs a pulse train corresponding to the current pulse width of the current pulse waveform applied to the machining gap only when the value detected by the voltage detection circuit 9 is not less than the predetermined level of voltage value representing a valid discharge at the machining gap.

For example, when the predetermined level of detection value is set as shown in FIG. 21(a), the detection value of the machining gap voltage exceeds the predetermined level if the machining status is a normal discharge or arc. Hence, the pulse train generation circuit 13A judges it as a valid discharge and outputs the pulse train. However, if the machining status is a short-circuit, the detection value of the machining gap voltage does not reach the predetermined level and the pulse train generation circuit 13A does not output the pulse train. The counter circuit 14 measures at intervals of the predetermined time Tp the total number of pulses contained in the pulse trains output by the pulse train generation circuit 13A. Accordingly, since the measurement result of the counter circuit 14 is the sum total of the pulses contained in the pulse trains generated within the predetermined time Tp and the pulse train corresponds to the current pulse width, the amount of current pulses supplied to the machining gap 3 at intervals of the predetermined time Tp can be measured precisely without a detection delay. Further, since the current pulses are measured only in the machining status where valid discharges influencing the consumption of the wire electrode occur, the measurement of the current pulses can be made with higher accuracy.

Accordingly, the amount of output energy supplied during machining can be detected, providing effective means for reliably preventing faulty machining such as the wire electrode breakage and centralized arcs. Also, the pulse train output by the pulse train generation circuit 13A is output during the off time as in the second embodiment to avoid the influence of noise generated by electrical discharge machining and to detect the output energy with higher accuracy, whereby the reliability of operation to prevent wire breakage can be much improved. Further, the pulse train generation circuit 13A can be designed to output the pulse train equivalent to the machining energy as in the third embodiment to precisely measure the energy amount of the current pulses supplied to the machining gap 3 without a detection delay.

Also, as described above, the counter circuit 14 measures at intervals of the predetermined time the total number of pulses contained in the pulse trains corresponding to the pulse widths of the current pulses supplied to the machining gap 3 and outputs the result of measurement (total number of pulses contained in the pulse trains generated within the predetermined time Tp) to the display device 15. As in the first embodiment, the display device 15 shows the measurement result of the counter circuit 14 as the energy output during machining to allow the operator to easily judge whether or not the set values of the machining condition parameters, such as the peak value, pulse width, off time, etc. of the current pulses, are appropriate, whereby it is possible to prevent the wire breakage from occurring. In addition, the machining conditions can be selected easily to reduce the operator burden.

Also, as described above, the counter circuit 14 measures at intervals of the predetermined time Tp the total number of pulse trains corresponding to the pulse widths of the current pulses supplied to the machining gap 3 and outputs the result of measurement (total number of pulse trains generated within the predetermined time) to the NC control apparatus 10. The NC control apparatus 10 changes and controls the machining condition parameters to be output to the machining power supply control circuit 8 according to the measurement result of the counter circuit 14. For example, when the total number of pulse trains generated within the predetermined time Tp is large, the NC control apparatus 10 judges that the energy output to the wire electrode is high and changes the set values of the machining condition parameters, such as the current pulse off duration, to reduce the total number of the pulse trains generated within the predetermined time Tp. Conversely, when the total number of pulse trains generated within the predetermined time Tp is small, the NC control apparatus 10 changes the set values of the machining condition parameters to increase the total number of pulse trains generated within the predetermined time Tp. Accordingly, the amount of current pulses supplied to the machining gap 3 at intervals of the predetermined time is measured without a detection delay, and further, the current pulses are measured only in the machining status where valid discharges influencing the consumption of the wire electrode occur. Since this allows the current pulses to be measured with higher accuracy, detecting the amount of the energy output during machining and controlling the output energy permits faulty machining such as the wire electrode breakage and centralized arcs to be prevented reliably.

Also, the present embodiment can be used with any of the second to the tenth embodiments.

As described above, according to the electrical discharge machining apparatus and its control method concerned with the present invention, the amount of current pulses supplied to the machining gap can be measured precisely without a detection delay, providing effective means for detecting the occurrence of faulty machining such as wire electrode breakage and centralized arcs.

Also, according to the electrical discharge machining apparatus and its control method concerned with the present invention, current pulses are measured only in the machining status where valid discharges influencing the consumption of the wire electrode occur, whereby the current pulses can be measured with higher accuracy, providing effective means for detecting the occurrence of faulty machining, such as wire electrode breakage and centralized arcs, with high reliability.

Also, according to the electrical discharge machining apparatus and its control method concerned with the present invention, misdetection due to noise generated while current pulses are supplied can be prevented to measure the amount of current pulses supplied to the machining gap with higher accuracy, thereby providing effective means for precisely detecting the occurrence of faulty machining such as wire electrode breakage and centralized arcs.

Also, according to the electrical discharge machining apparatus and its control method concerned with the present invention, the energy amount of current pulses supplied to the machining gap can be measured precisely without a detection delay, and especially when a plurality of current pulses (including two different current pulses) are applied to the machining gap, the energy amount output during machining can be detected accurately with a small detection error of the energy amount of the current pulses, thereby providing effective means for detecting the occurrence of faulty machining, such as wire electrode breakage and centralized arcs, with high accuracy.

Also, according to the electrical discharge machining apparatus and its control method concerned with the present invention, the energy amount of current pulses applied to the machining gap at intervals of predetermined time can be detected without delay, and further, the arrangement of the counter circuit can be simplified, whereby effective means for detecting the occurrence of faulty machining, such as wire electrode breakage and centralized arcs, can be designed with a low-priced device.

Also, according to the electrical discharge machining apparatus and its control method concerned with the present invention, the amount of current pulses (or the energy amount of current pulses) output during machining can be detected and the current pulses (or the energy amount of current pulses) output can be controlled to a value according to machining conditions, whereby the occurrence of faulty machining, such as wire electrode breakage and centralized arcs, can be prevented.

Also, according to the electrical discharge machining apparatus and its control method concerned with the present invention, the amount of current pulses supplied to the machining gap is controlled to a constant value, whereby the amount of energy output during machining is made constant and faulty machining such as wire electrode breakage and centralized arcs can be prevented reliably to improve the stability of machining.

Also, according to the electrical discharge machining apparatus and its control method concerned with the present invention, the amount of current pulses supplied to the machining gap is controlled to a constant value, whereby the amount of energy output during machining is made constant and faulty machining such as wire electrode breakage and centralized arcs can be prevented reliably to improve the stability of machining.

What is claimed is:

1. An electric discharge machining apparatus in which a pulse voltage is applied across a wire-shaped electrode and a workpiece to machine the workpiece with electrical discharges, comprising:
   pulse train generating means for outputting a pulse train representing a machining current supplying duration;
   pulse count integrating means for integrating, within a predetermined time, the number of pulses of pulse trains generated by said pulse train generating means; and
   control means for controlling a machining condition according to a result of pulse number integration carried out by said pulse count integrating means.

2. An electric discharge machining apparatus in which a pulse voltage is applied across a wire-shaped electrode and a workpiece to machine the workpiece with electrical discharges, comprising:
   voltage detecting means for measuring a voltage during discharge;
   pulse train generating means for outputting a pulse train representing a machining current supplying duration only when the voltage detected by said voltage detecting means exceeds a certain voltage level representing valid electric discharge in an interelectrode gap;
   pulse count integrating means for integrating, within a predetermined time, the number of pulses of pulse trains generated by said pulse train generating means; and
   control means for controlling a machining condition according to a result of pulse number integration carried out by said pulse count integrating means.

3. The electric discharge machining apparatus as defined in claim 2 wherein said pulse train generating means outputs the pulse train such that the number of pulses corresponds to machining energy.

4. An electric discharge machining apparatus in which a pulse voltage is applied across a wire-shaped electrode and a workpiece to machine the workpiece with electrical discharges, comprising:
   · pulse train generating means for outputting a pulse train representing a machining current supplying duration;
   pulse count integrating means for integrating, within a predetermined time, the number of pulses of pulse trains generated by said pulse train generating means;
   energy amount arithmetic means for calculating an amount equivalent to a machining energy from a result of the pulse count integrating means; and
   control means for controlling a machining condition according to an arithmetic result of said energy amount arithmetic means.

5. An electric discharge machining apparatus in which a pulse voltage is applied across a wire-shaped electrode and a workpiece to machine the workpiece with electrical discharges, comprising:
   voltage detecting means for measuring a voltage during discharge;
   pulse train generating means for outputting a pulse train representing a machining current supplying duration only when the voltage detected by said voltage detecting means exceeds a certain voltage level representing valid electric discharge in an interelectrode gap;
   pulse count integrating means for integrating, within a predetermined time, the number of pulses of pulse trains generated by said pulse train generating means;
   energy amount arithmetic means for calculating an amount equivalent to a machining energy from a result of the pulse count integrating means; and
   control means for controlling a machining condition according to an arithmetic result of said energy amount arithmetic means.

6. The electric discharge machining apparatus as defined in claim 5, wherein said pulse train generating means outputs a pulse train representing machining current supplying duration after stopping the supply of machining current.

7. An electric discharge machining apparatus as defined in claim 5, further comprising display means for showing a result of at least one of said pulse count integrating means and said energy amount arithmetic means.

8. An electric discharge machining apparatus in which a pulse voltage is applied across a wire-shaped electrode and a workpiece to machine the workpiece with electrical discharges, comprising:

energy detecting means for detecting an amount of energy generated within a predetermined period of time; and a control means for stopping the supply of machining current when a detected amount of said energy detecting means exceeds a predetermined amount, to thereby control the amount of energy applied to an interelectrode gap between the wire-shaped electrode and the workpiece.

9. The electric discharge machining apparatus as defined in claim 8, further comprising display means for showing a result of said energy detecting means.

10. A control method for use in an electrical discharge machining apparatus in which a pulse voltage is applied to an interelectrode gap between a wire-shaped electrode and a workpiece to machine the workpiece, comprising the steps of:

outputting a pulse train representing machining current supplying time duration;

integrating the pulses of said pulse train within a predetermined period of time; and controlling a machining condition based on the integration result.

11. The control method as defined in claim 10, wherein said pulse train is outputted representing machining current supplying duration after stopping the supply of machining current.

12. A control method for use in an electrical discharge machining apparatus in which a pulse voltage is applied to an interelectrode gap between a wire-shaped electrode and a workpiece to machine the workpiece, comprising the steps of:

(a) detecting a voltage during the occurrence of discharge;

(b) outputting a pulse train representing a machining current supplying duration only when the voltage detected by said voltage detecting means exceeds a certain voltage level representing valid electric discharge in an interelectrode gap;

(c) integrating, within a predetermined time, the number of pulses of pulse trains generated in step (b); and (d) controlling a machining condition according to the result of pulse number integration in step (c).

13. The control method as defined in claim 12 wherein the number of pulses in said pulse train is output to correspond to machining energy.

14. A control method for an electrical discharge machining apparatus in which a pulse voltage is applied across a wire-shaped electrode and a workpiece to machine the workpiece with electrical discharges, comprising the steps of:

(a) outputting a pulse train representing a machining current supplying duration;

(b) integrating, within a predetermined time, the number of pulses of pulse trains generated in step (a);

(c) calculating an amount equivalent to a machining energy from the result of the pulse count integration in step (b); and (d) controlling a machining condition according to the result of said energy amount arithmetic operation in step (c).

15. A control method for an electrical discharge machining apparatus in which a pulse voltage is applied across a wire-shaped electrode and a workpiece to machine the workpiece with electrical discharges, comprising the steps of:

(a) detecting a voltage during the occurrence of discharge;

(b) outputting a pulse train representing a machining current supplying duration only when the voltage detected by said voltage detecting means exceeds a certain voltage level representing valid electric discharge in an interelectrode gap;

(c) integrating, within a predetermined time, the number of pulses of pulse trains generated in step (b);

(d) calculating an amount equivalent to a machining energy from the result of the pulse count integration in step (c); and (e) controlling a machining condition according to the result of said energy amount arithmetic operation in step (d).

16. The control method as defined in claim 15, further comprising the step of:

(f) displaying the result of pulse count integration in step (c) or energy amount calculation in step (d).

17. A control method for an electrical discharge machining apparatus in which a pulse voltage is applied across a wire-shaped electrode and a workpiece to machine the workpiece with electrical discharges, comprising the steps of:

(a) detecting an amount of energy generated within a predetermined period of time; and (b) stopping the supply of machining current when the detected energy exceeds a predetermined amount, to thereby control the amount of energy applied to an interelectrode gap between the wire-shaped electrode and the workpiece.

18. The control method as defined in claim 17, further comprising the step of:

(c) displaying the result of energy detection in step (a).

* * * * *